(12) United States Patent  (10) Patent No.: US 8,726,047 B2
Lee et al.  (45) Date of Patent: May 13, 2014

(54) SYSTEM ON CHIP, DEVICES HAVING THE SAME, AND METHOD FOR POWER CONTROL OF THE SOC

(75) Inventors: Jae Gon Lee, Yongin-si (KR); Jang Ho Cho, Yongin-si (KR); Bong Il Park, Seongnam-si (KR); Kwang Ho Kim, Hwaseong-si (KR); Taek Kyun Shin, Gwangmyeong-si (KR); Dong Keun Kim, Seoul (KR); Jae Young Lee, Hwaseong-si (KR); Yung Hei Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 316 days.

(21) Appl. No.: 13/103,535

(22) Filed: May 9, 2011

(65) Prior Publication Data

US 2011/0276812 A1 Nov. 10, 2011

(30) Foreign Application Priority Data

May 7, 2010 (KR) .................. 10-2010-0043070
May 6, 2011 (KR) .................. 10-2011-0043094

(51) Int. Cl.
*G06F 1/00* (2006.01)
*G06F 1/32* (2006.01)

(52) U.S. Cl.
USPC ........................... 713/300; 713/320; 713/330

(58) Field of Classification Search
USPC ...................................................... 713/300
See application file for complete search history.

(56) References Cited

U.S. PATENT DOCUMENTS

| | | | |
|---|---|---|---|
| 6,665,802 B1 | 12/2003 | Ober | |
| 6,895,530 B2 * | 5/2005 | Moyer et al. | 714/25 |
| 7,178,044 B2 * | 2/2007 | Pappalardo et al. | 713/300 |
| 7,369,815 B2 * | 5/2008 | Kang et al. | 455/73 |
| 7,555,422 B2 * | 6/2009 | Newman et al. | 703/23 |
| 7,739,528 B2 | 6/2010 | Zhuang et al. | |
| 7,839,016 B2 * | 11/2010 | Wang et al. | 307/31 |
| 7,895,458 B2 * | 2/2011 | Kim | 713/330 |
| 8,286,012 B2 * | 10/2012 | Malhi et al. | 713/300 |
| 2005/0239518 A1 | 10/2005 | D'Agostino et al. | |
| 2009/0256607 A1 * | 10/2009 | Smith et al. | 327/198 |
| 2010/0205467 A1 | 8/2010 | Park | |

FOREIGN PATENT DOCUMENTS

| | | |
|---|---|---|
| JP | 09-230967 | 9/1997 |
| JP | 2005-312011 | 11/2005 |
| KR | 1020060045582 A | 5/2006 |
| KR | 1020100090513 A | 8/2010 |

* cited by examiner

*Primary Examiner* — Suresh Suryawanshi
(74) *Attorney, Agent, or Firm* — Myers Bigel Sibley & Sajovec PA

(57) ABSTRACT

Disclosed is an integrated circuit device including a plurality of power domain blocks, which includes a core power domain block. A power control circuit is configured to control power supplied to each of the plurality of power domain blocks independently responsive to control communication from the core power domain block. The power control circuit includes a plurality of power clusters corresponding to the plurality of power domain blocks, respectively. The plurality of power clusters control power supplied to the plurality of power domain blocks, respectively, independently responsive to the control communication from the core power domain block.

23 Claims, 28 Drawing Sheets

US 8,726,047 B2

1

SYSTEM ON CHIP, DEVICES HAVING THE SAME, AND METHOD FOR POWER CONTROL OF THE SOC

CROSS-REFERENCE TO RELATED APPLICATIONS

This application claims the benefits, under 35 U.S.C §119, of Korean Patent Application Nos. 10-2010-0043070 filed May 7, 2010, and 10-2011-0043094 filed May 6, 2011 the disclosure of which is hereby incorporated by reference herein in its entirety.

BACKGROUND

1. Field

Exemplary embodiments of the present inventive concept relate to a power management technology, and, more particularly, to a System on Chip (SoC) that may control a power state and an operation state of each power domain independently according to configuration register values set in finite state machines, devices having the same, and a method for power control of the SoC.

2. Description of the Related Art

With advances in semiconductor fabrication technologies, the number of elements that are capable of being provided within one integrated circuit has increased. As the number of elements provided within one integrated circuit increases, elements, such as a memory, a processor, a voltage controlling circuit, etc., have been integrated within one integrated circuit. Some systems may include elements, such as a memory, a processor, a voltage controlling circuit, etc. These systems may be called a System-on-Chip (Soc). As a single chip, the SoC occupies less area and consumes less power as compared to conventional systems.

Along with development of semiconductor manufacturing technology, the number of intellectual properties (IPs) that may be integrated on an integrated circuit, e.g., a system on chip SoC, increases. Accordingly, a method for controlling power, which is consumed in an electronic device using a battery for power and including a Soc, has been studied.

SUMMARY

One aspect of embodiments of the inventive concept is directed to providing an integrated circuit device comprising a plurality of power domain blocks, which includes a core power domain block. A power control circuit is configured to control power supplied to each of the plurality of power domain blocks independently responsive to control communication from the core power domain block. The power control circuit comprises a plurality of power clusters corresponding to the plurality of power domain blocks, respectively. The plurality of power clusters control power supplied to the plurality of power domain blocks, respectively, independently responsive to the control communication from the core power domain block.

BRIEF DESCRIPTION OF THE FIGURES

The above and other objects and features will become apparent from the following description with reference to the following figures, wherein like reference numerals refer to like parts throughout the various figures unless otherwise specified, and wherein

2

Figure 1:
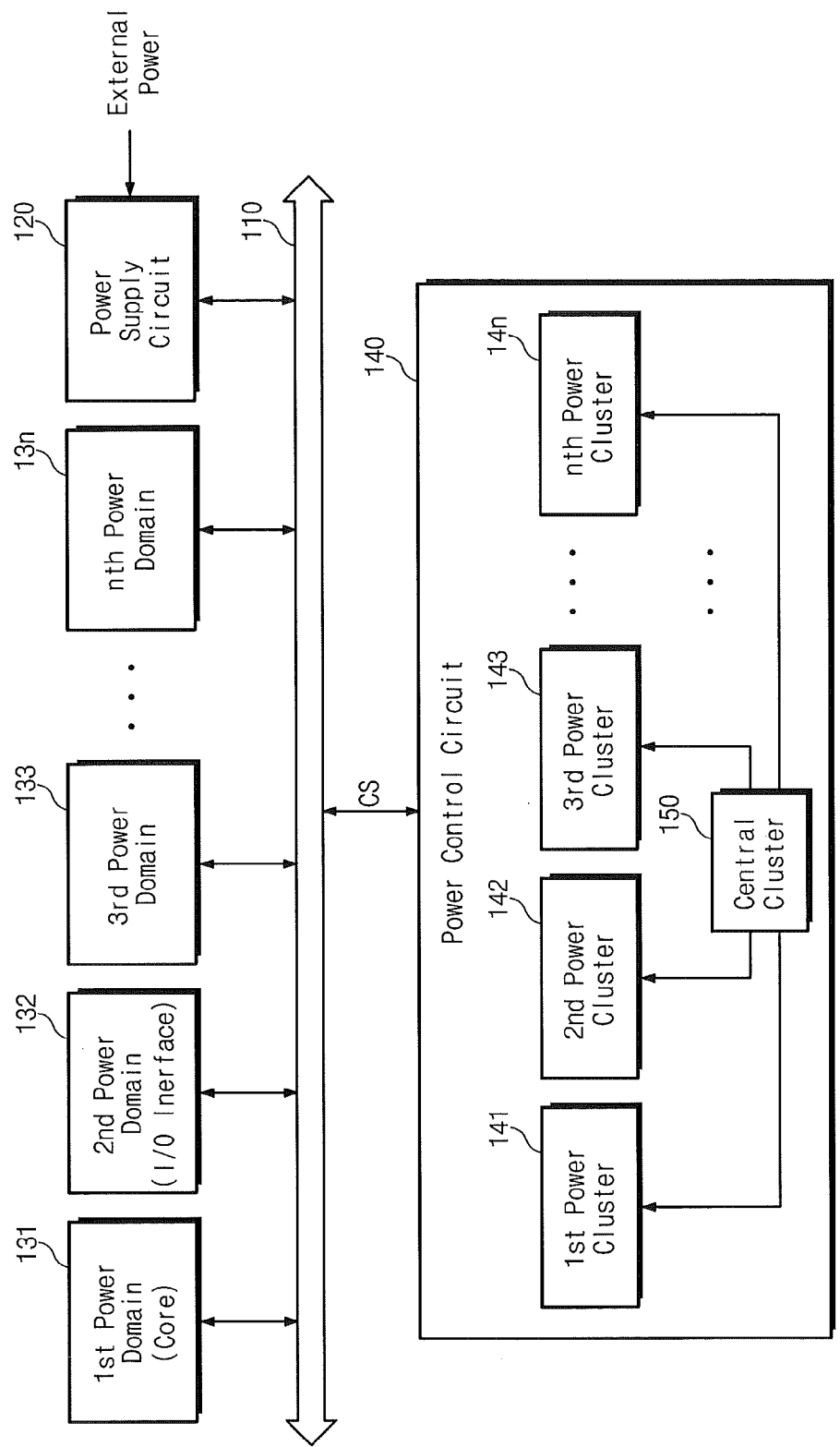

FIG. 1 is a block diagram showing an integrated circuit device according to an exemplary embodiment of the inventive concept.

Figure 2:
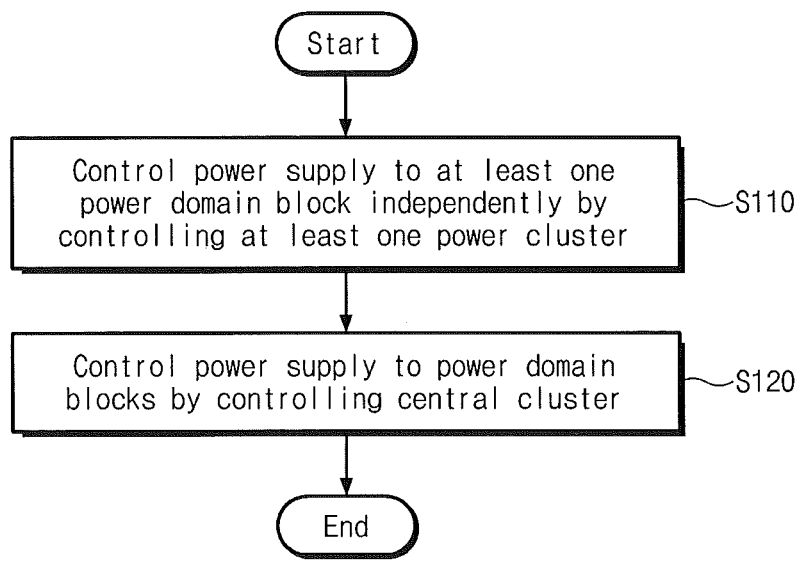

FIG. 2 is a flow chart illustrating an operating method of an integrated circuit device in FIG. 1 according to some embodiments of the inventive concept.

Figure 3:
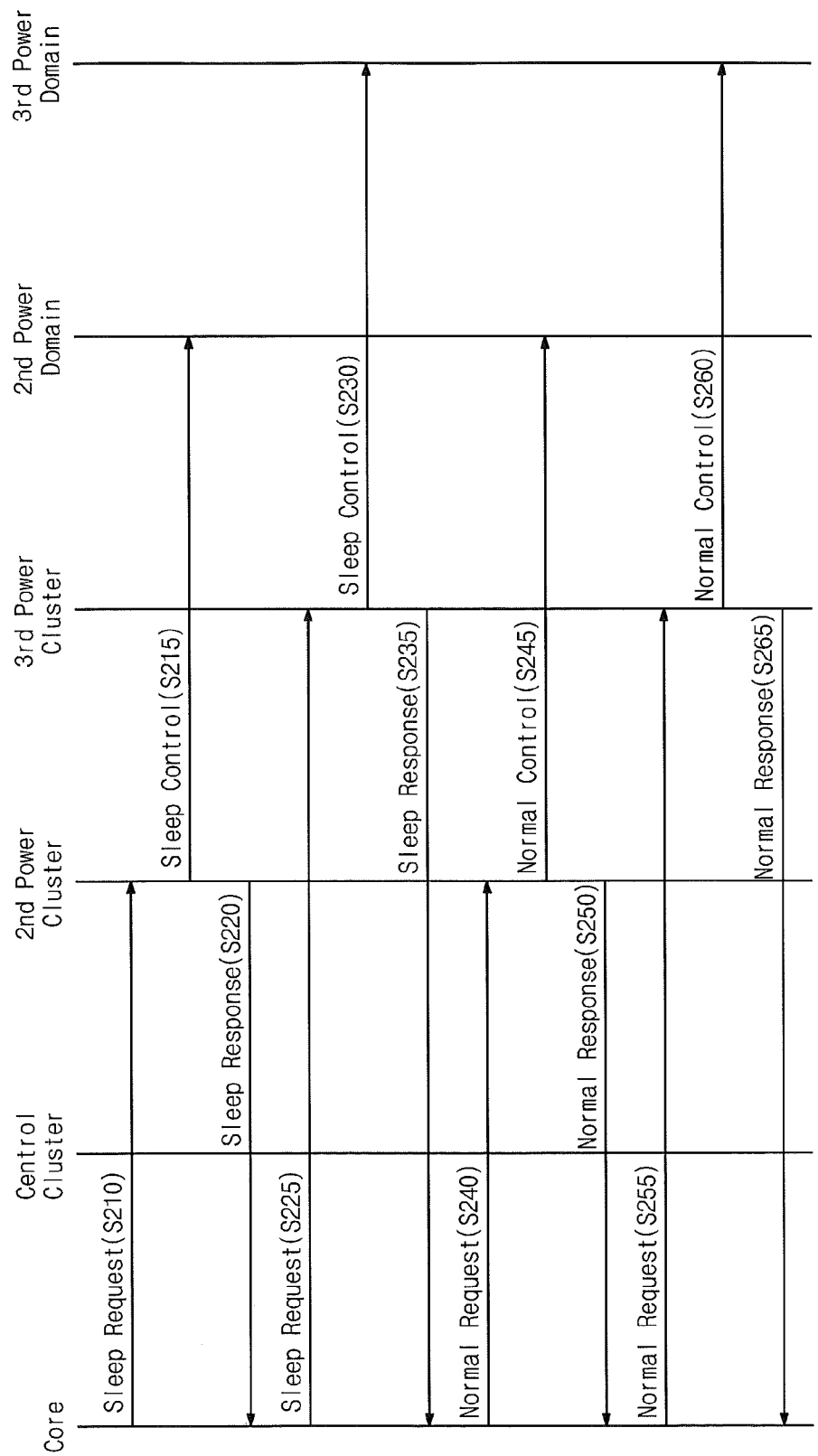

FIG. 3 is a flow chart illustrating a process in which power domain blocks enter a sleep mode or a normal mode by a power domain block unit according to some embodiments of the inventive concept.

Figure 4:
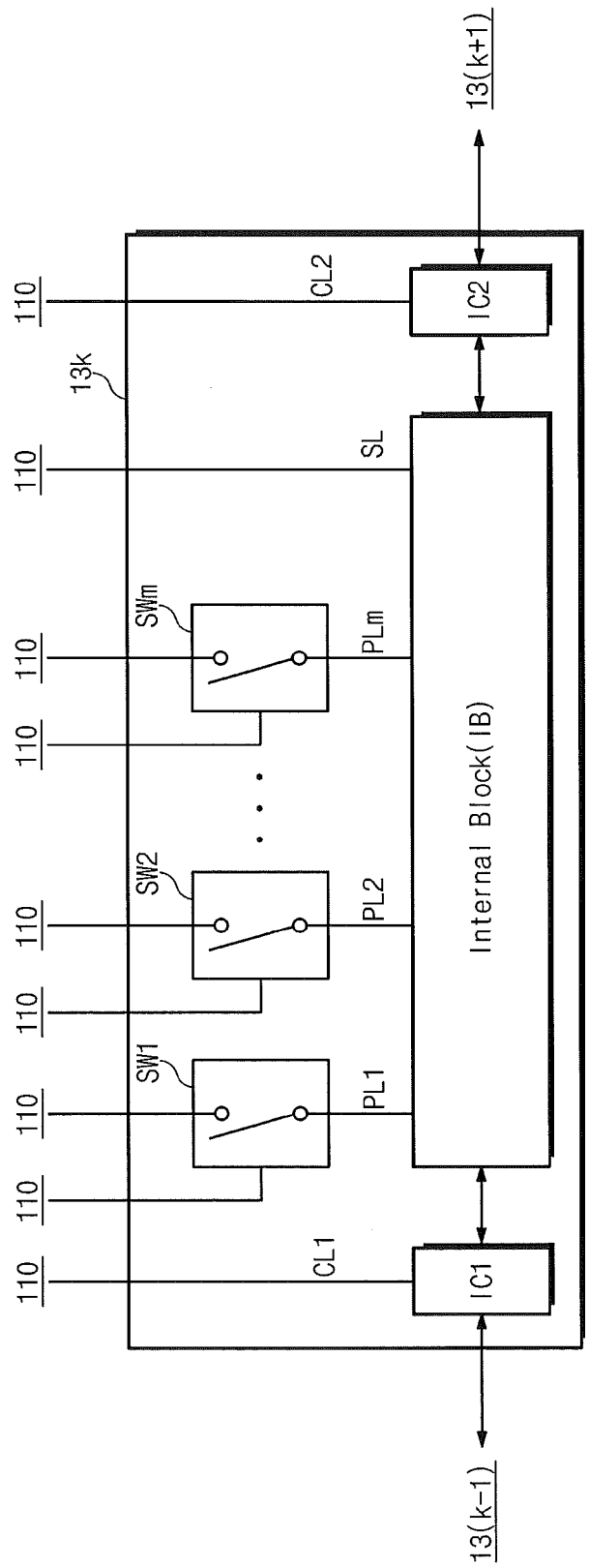

FIG. 4 is a block diagram illustrating one of the first to nth power domain blocks in FIG. 1 according to some embodiments of the inventive concept.

Figure 5:
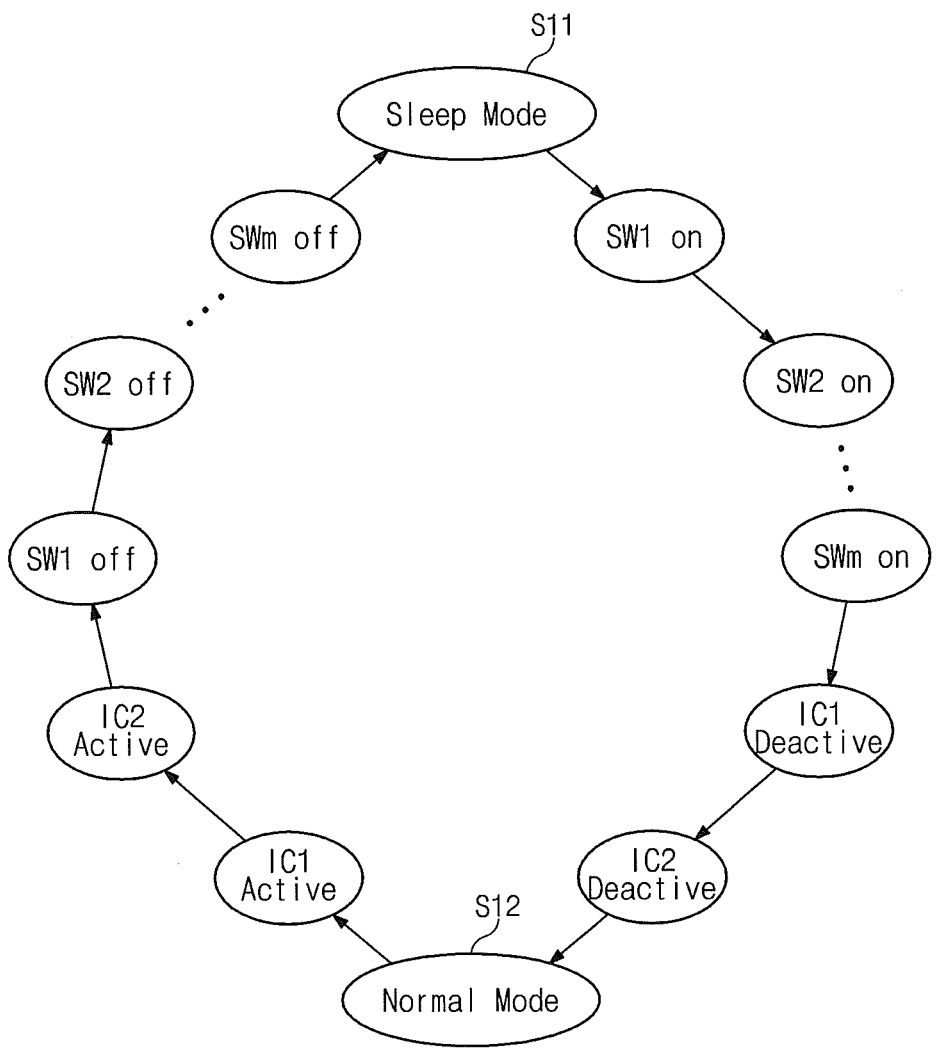

FIG. 5 is a state transition diagram illustrating an operating method of a power cluster controlling a power domain block in FIG. 4 according to some embodiments of the inventive concept.

Figure 6:
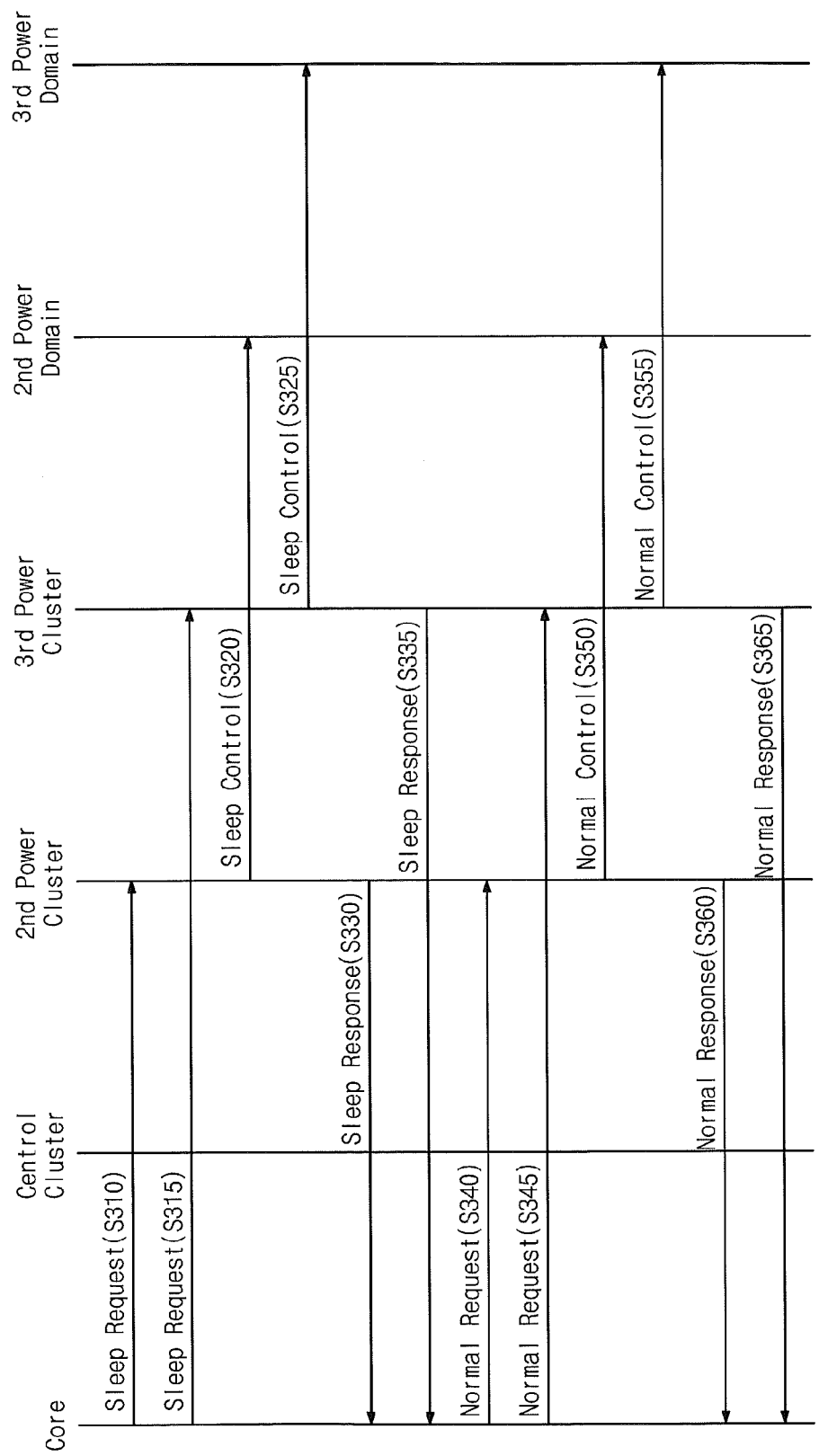

FIG. 6 is a flow chart illustrating a process in which power domain blocks enter a sleep mode or a normal mode by a power domain block unit according to further embodiments of the inventive concept.

Figure 7:
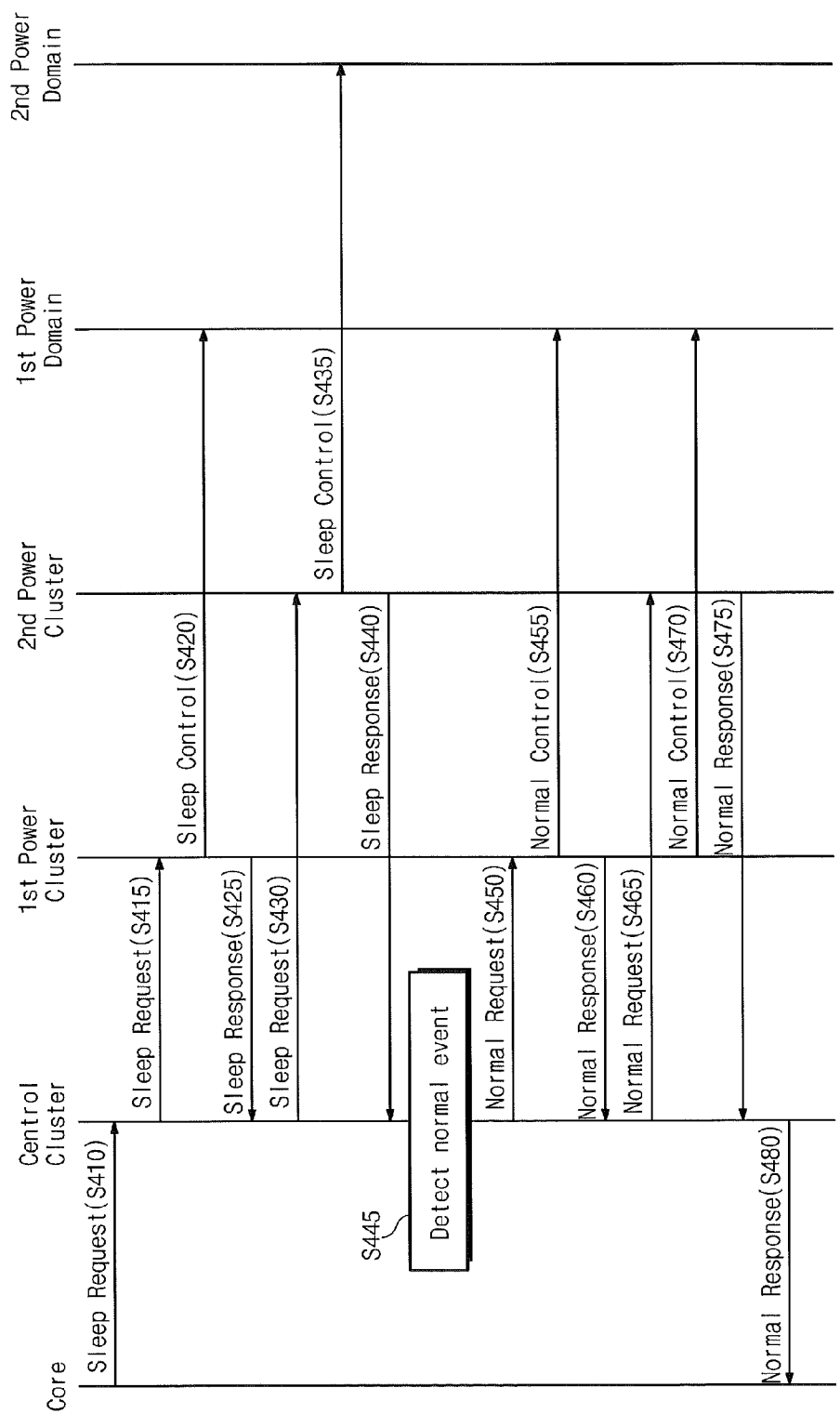

FIG. 7 is a flow chart illustrating a process in which power supply to power domain blocks is controlled by controlling a central cluster in FIG. 2 according to some embodiments of the inventive concept.

Figure 8:
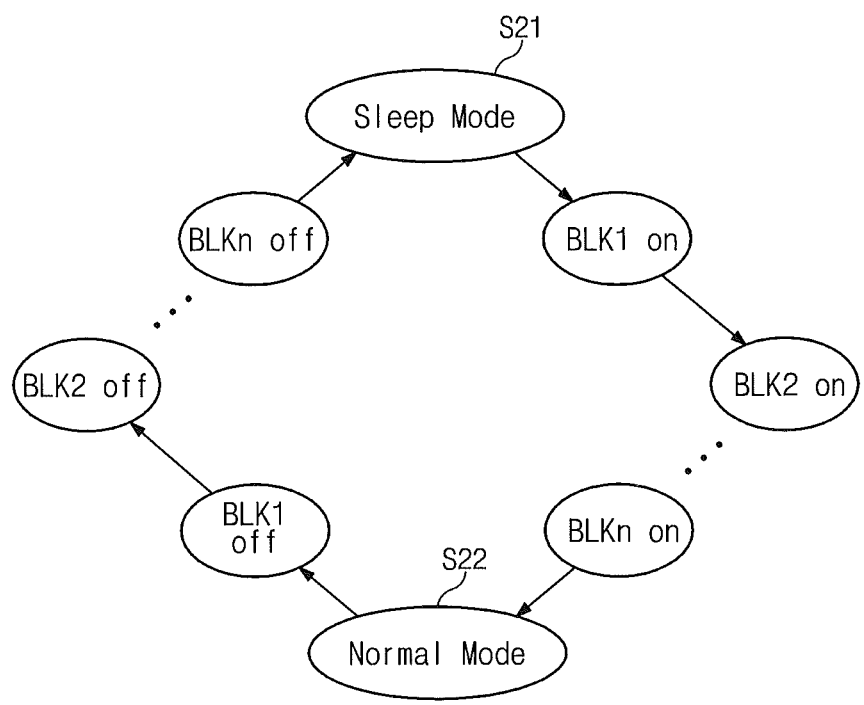

FIG. 8 is a state transition diagram illustrating an operating method of a central cluster in FIG. 1 according to some embodiments of the inventive concept.

Figure 9:
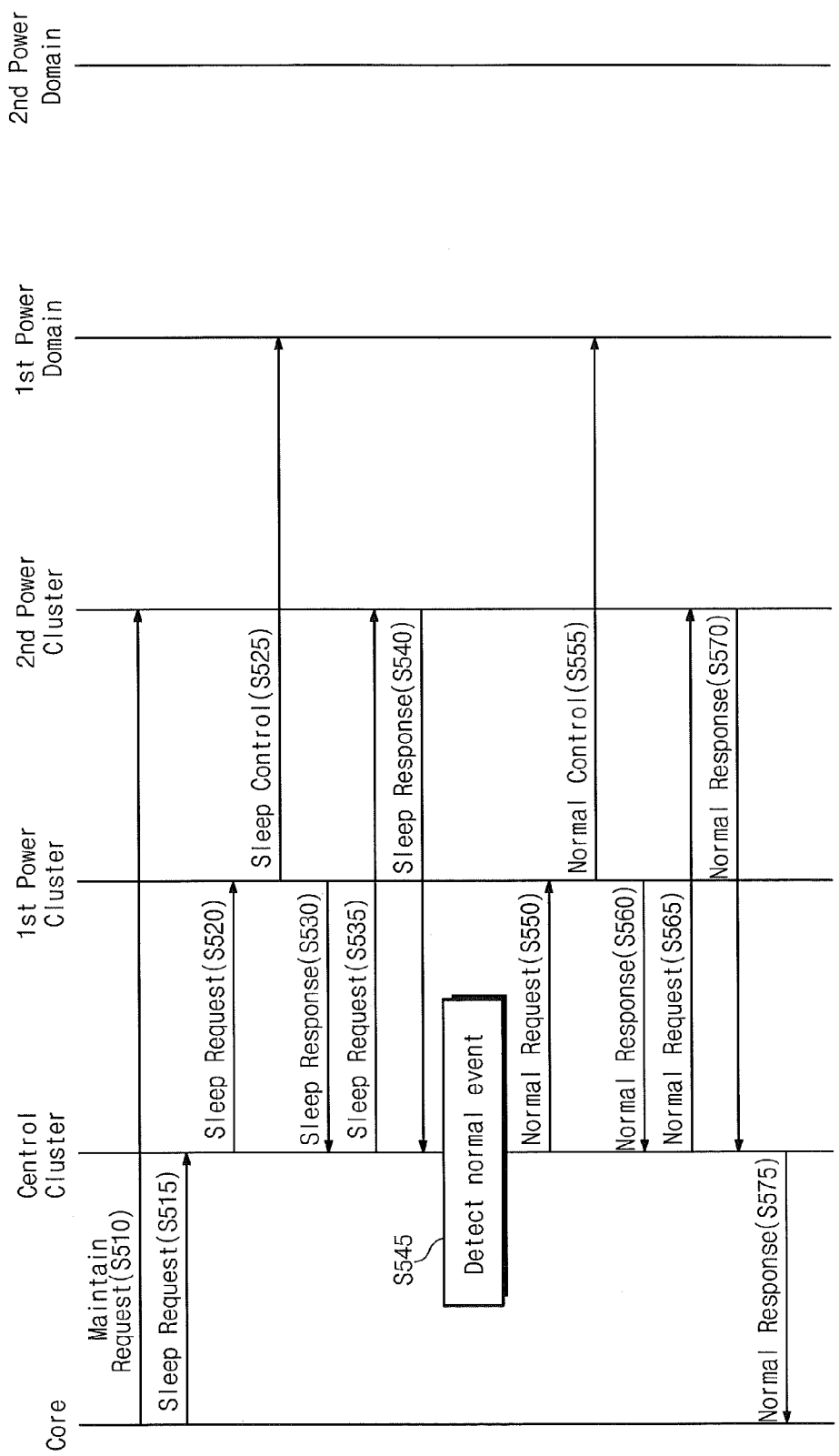

FIG. 9 is a flow chart illustrating a process in which power supply to power domain blocks is controlled by controlling a central cluster in FIG. 2 according to some embodiments of the inventive concept.

Figure 10:
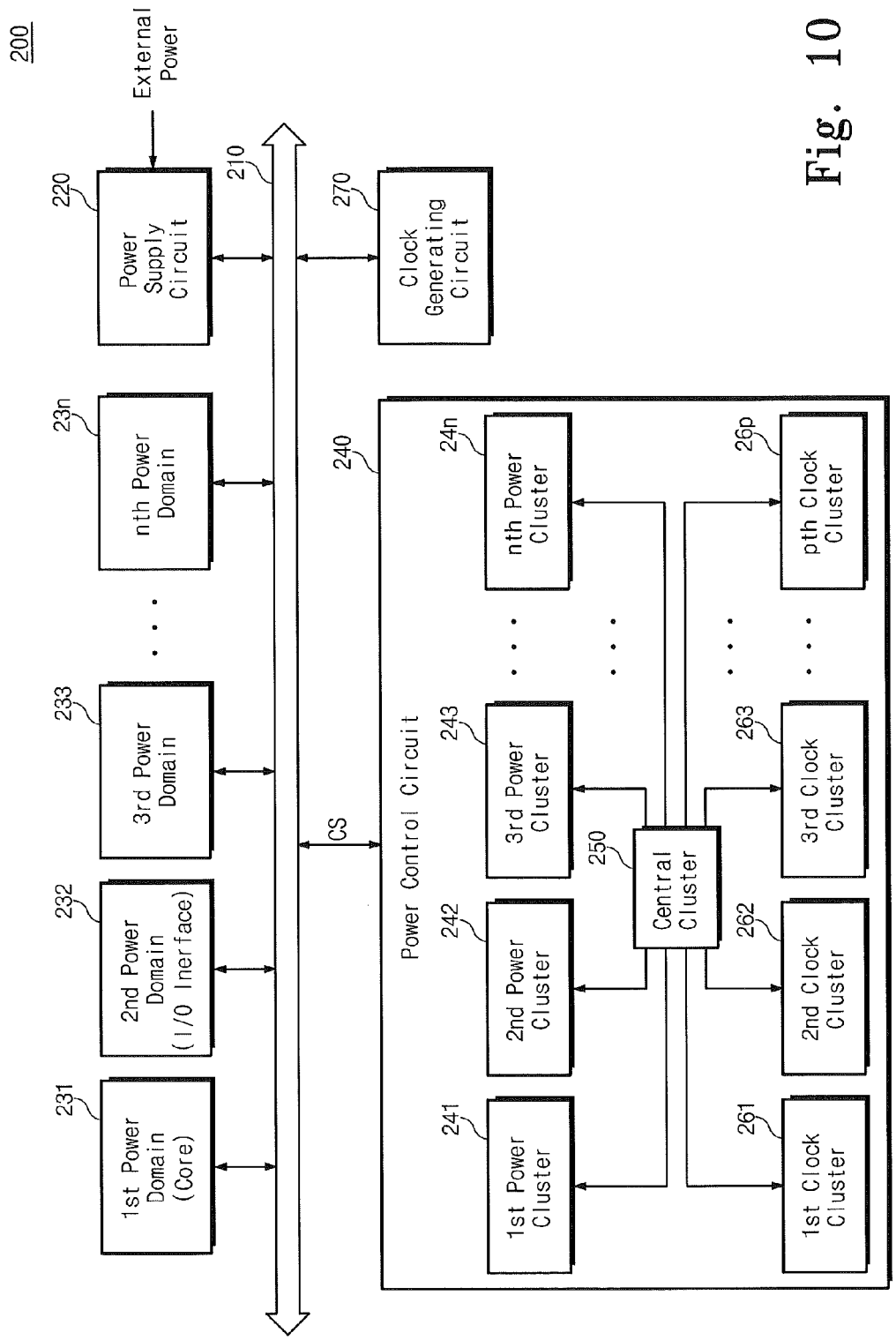

FIG. 10 is a block diagram illustrating an integrated circuit device according to further embodiments of the inventive concept.

Figure 11:
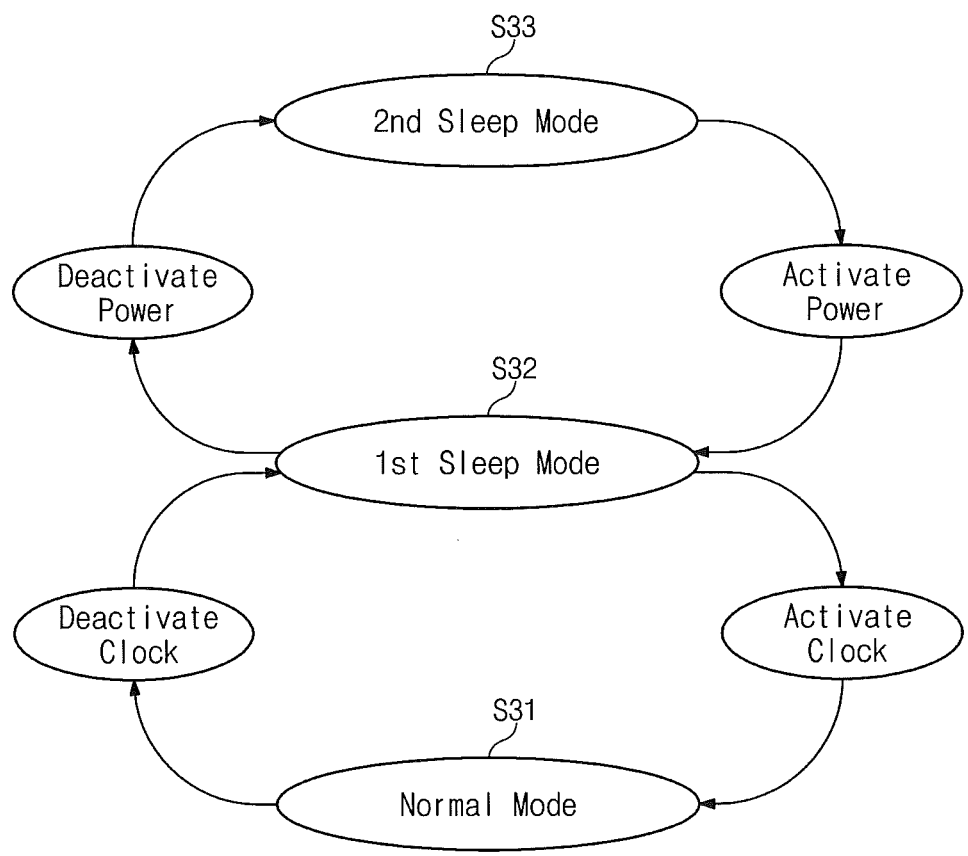

FIG. 11 is a state transition diagram showing an operating method of a power control circuit in FIG. 10 according to some embodiments of the inventive concept.

Figure 12:
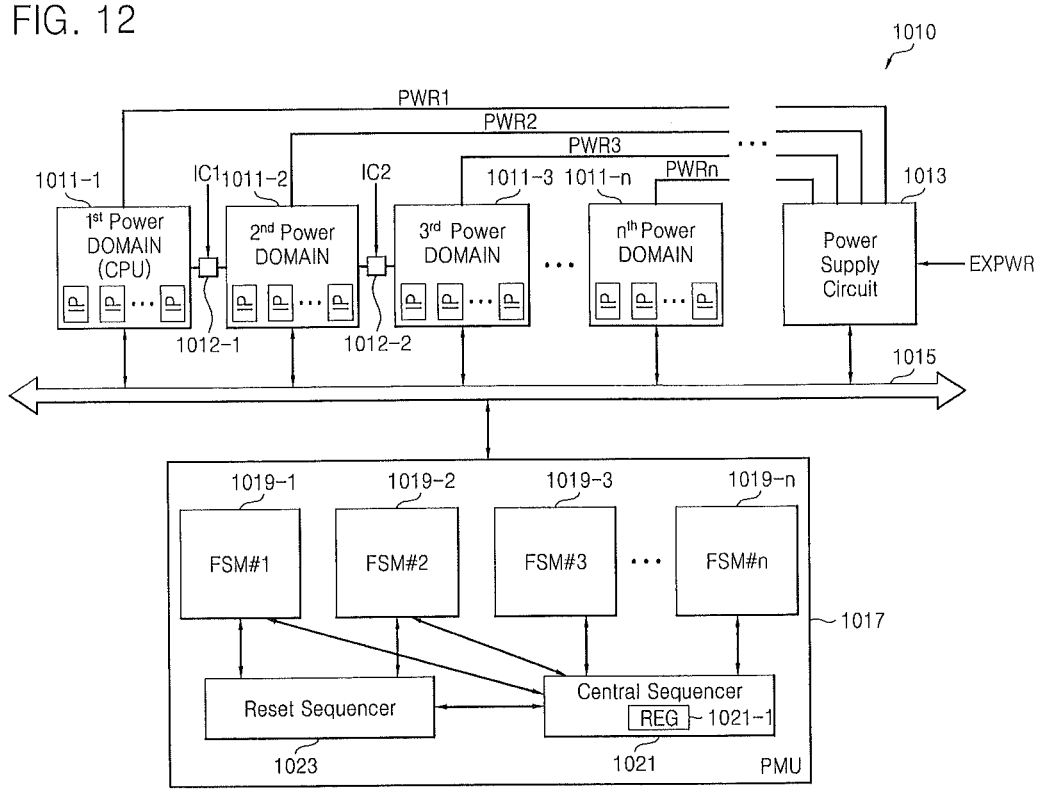
Figure 13:
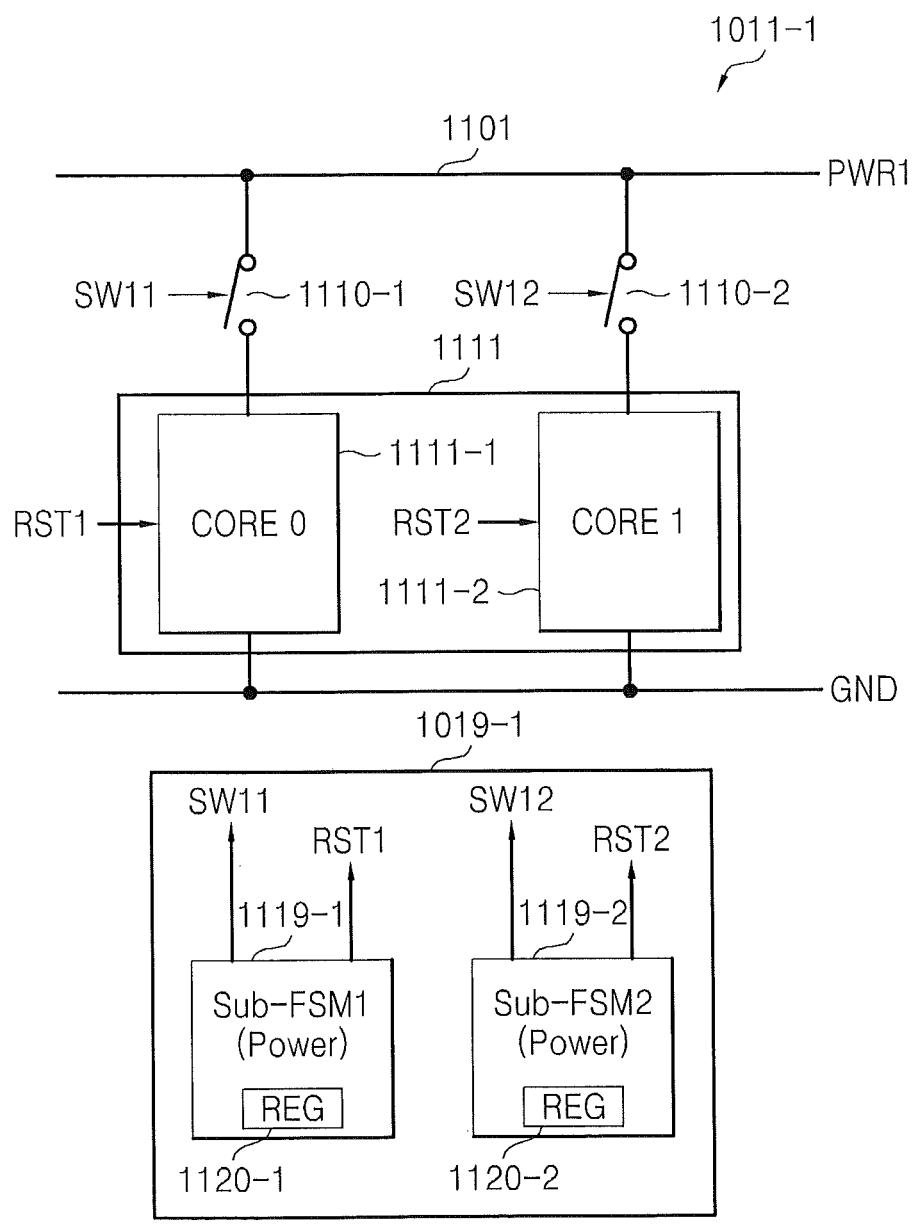
Figure 14:
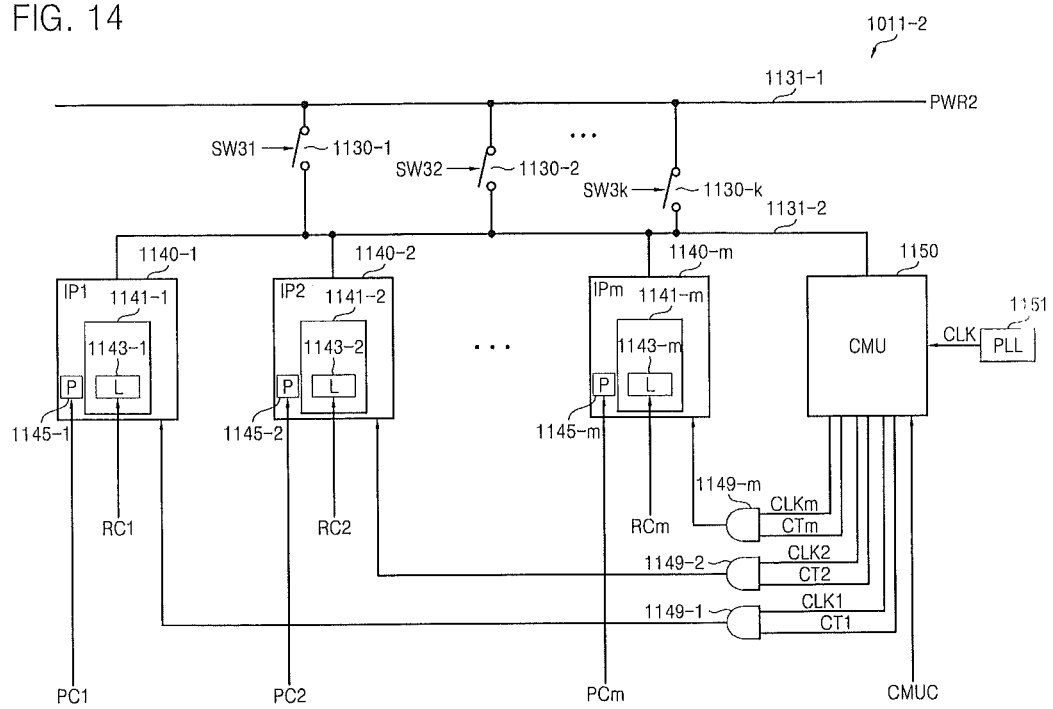
Figure 15:
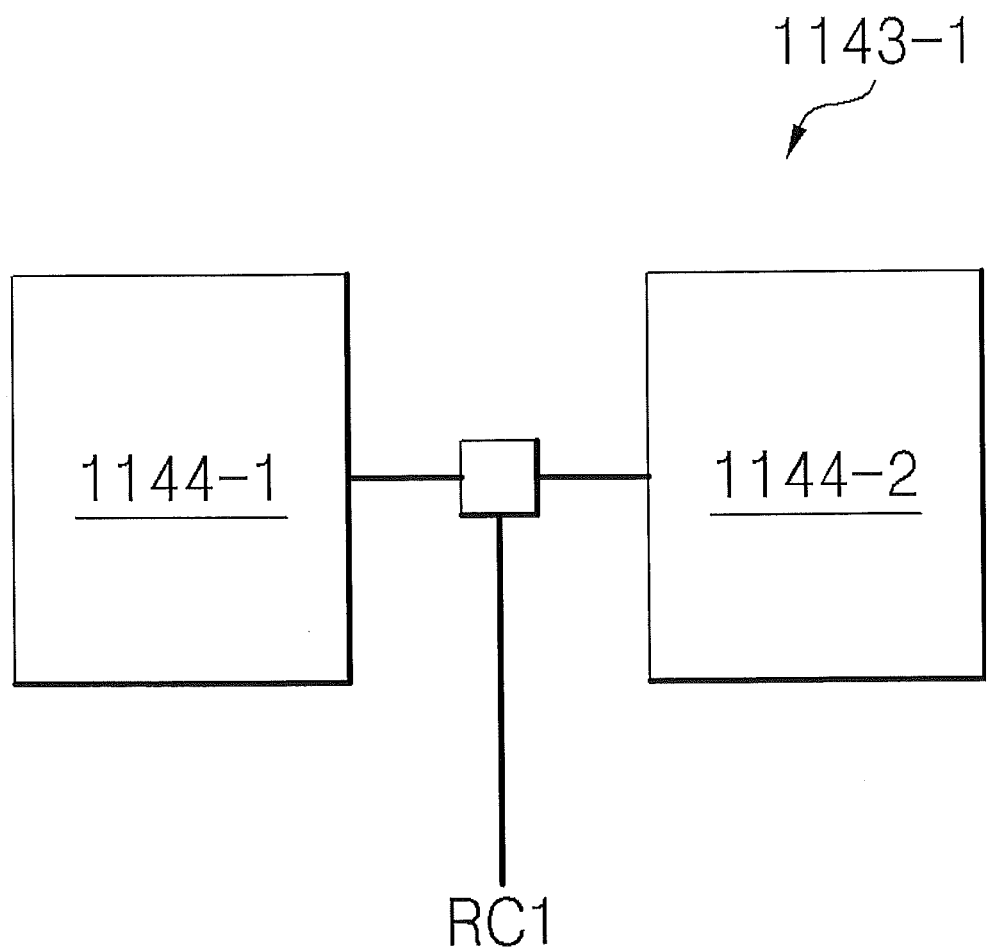
Figure 16:
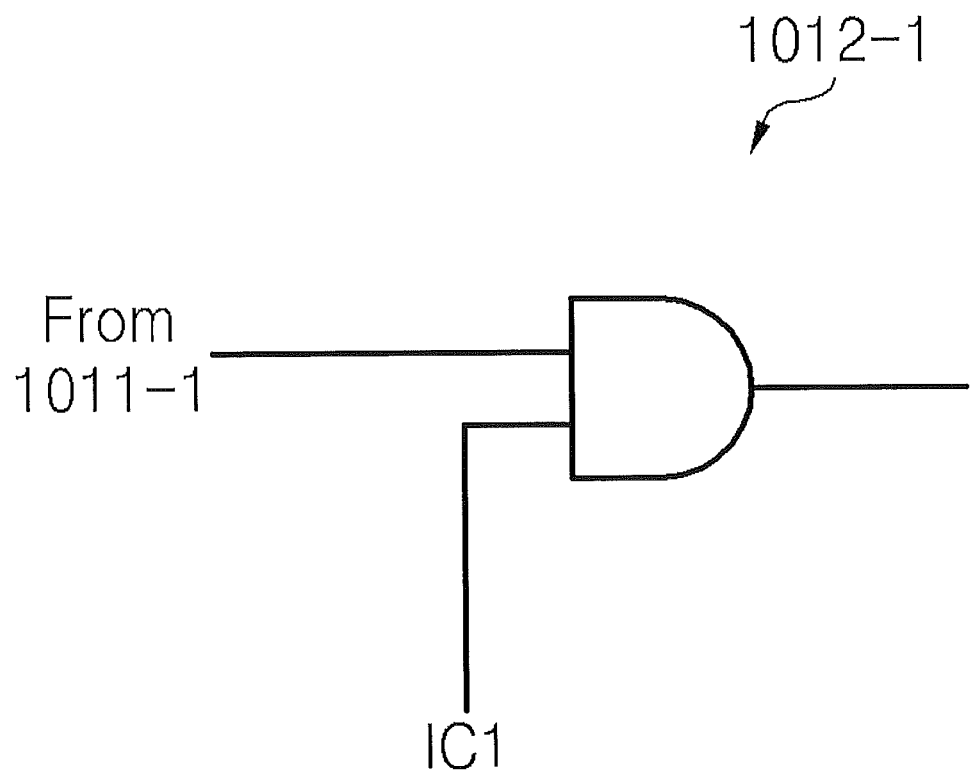
Figure 17:
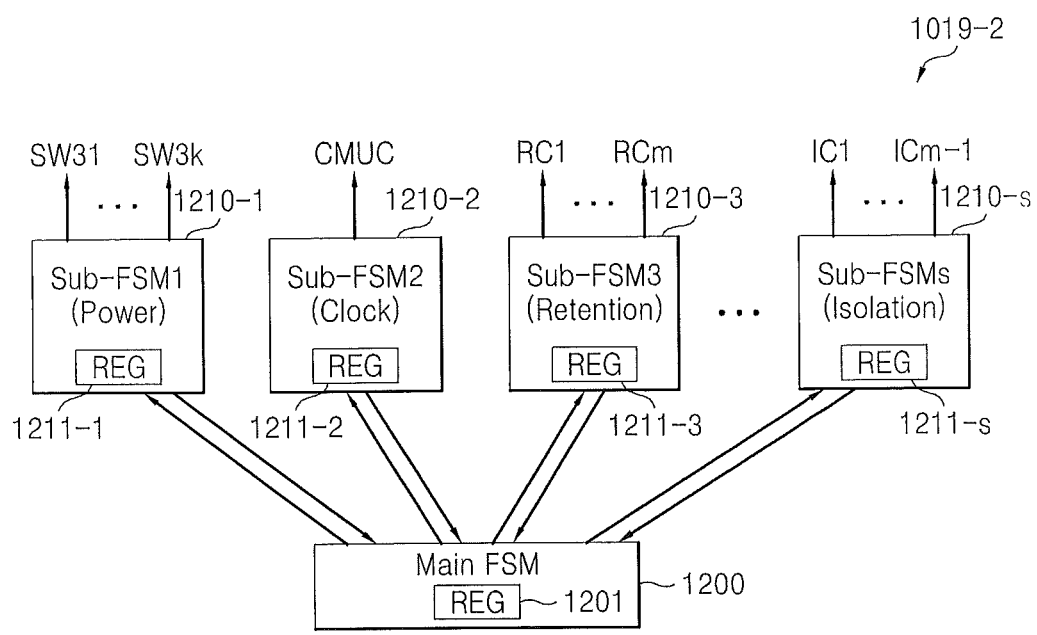
Figure 18:
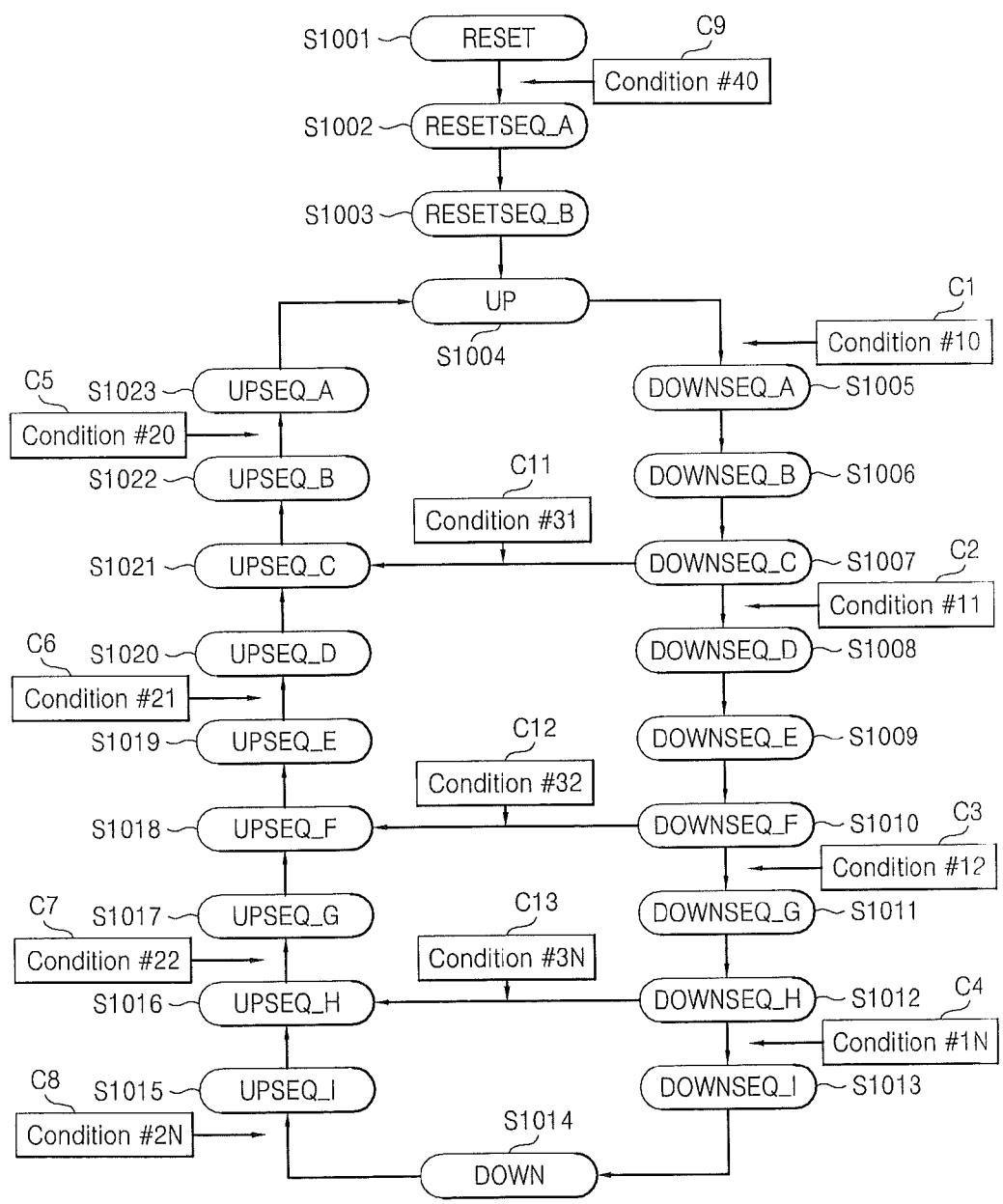
Figure 19:
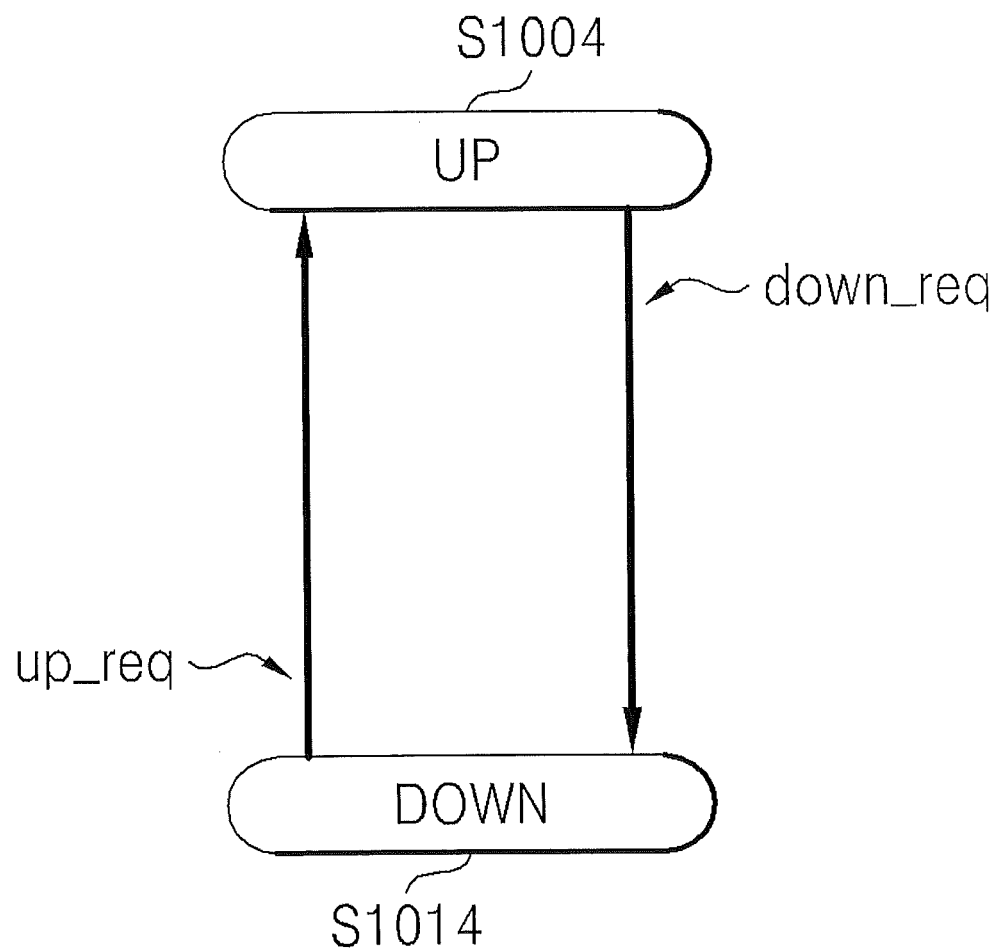
Figure 20:
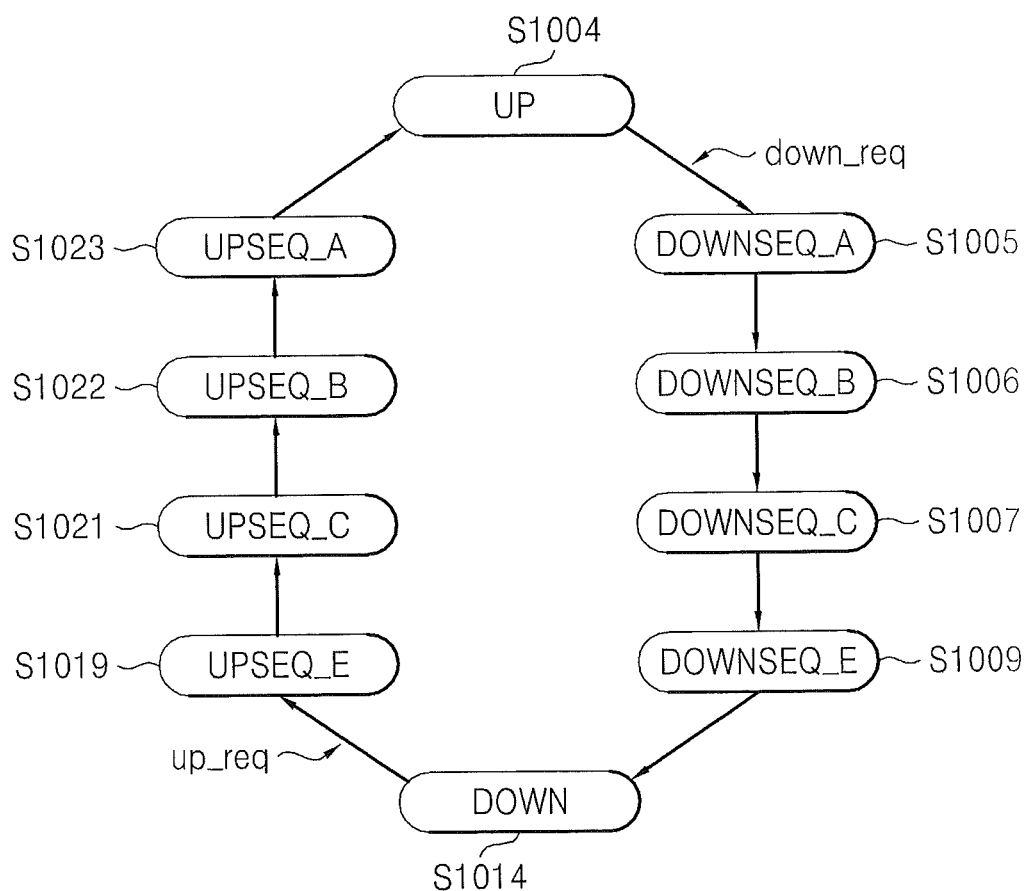
Figure 21:
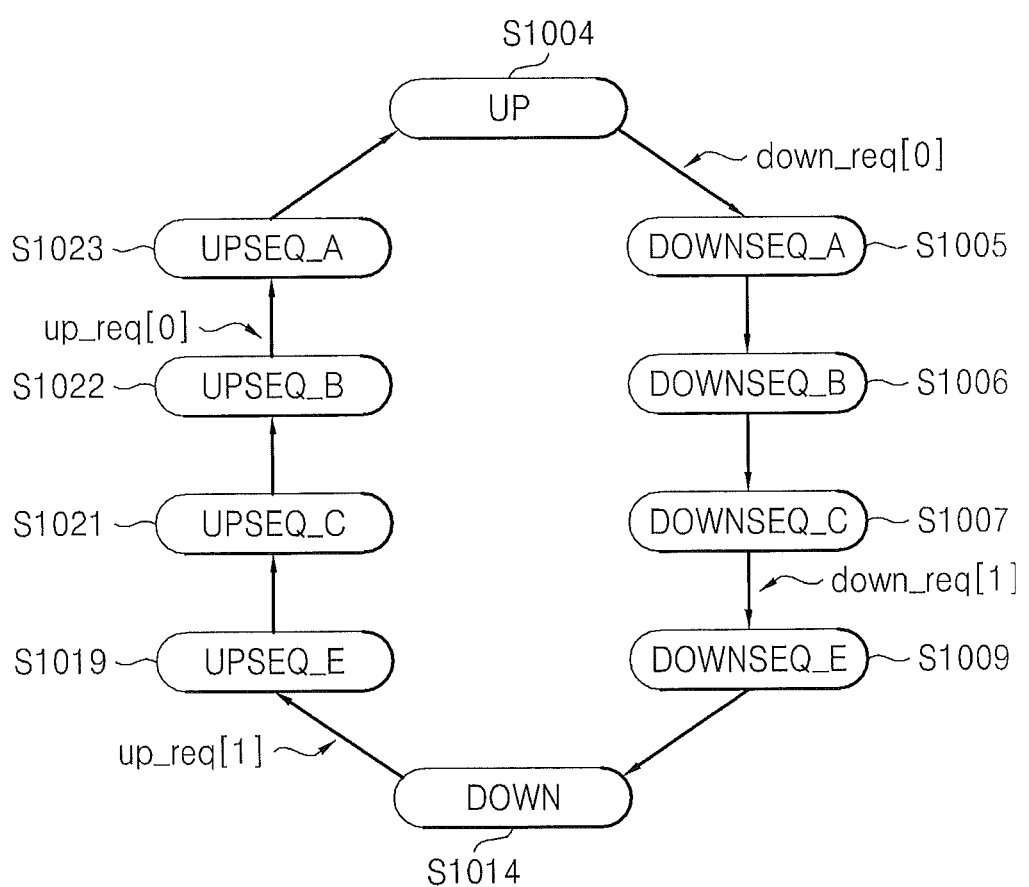
Figure 22:
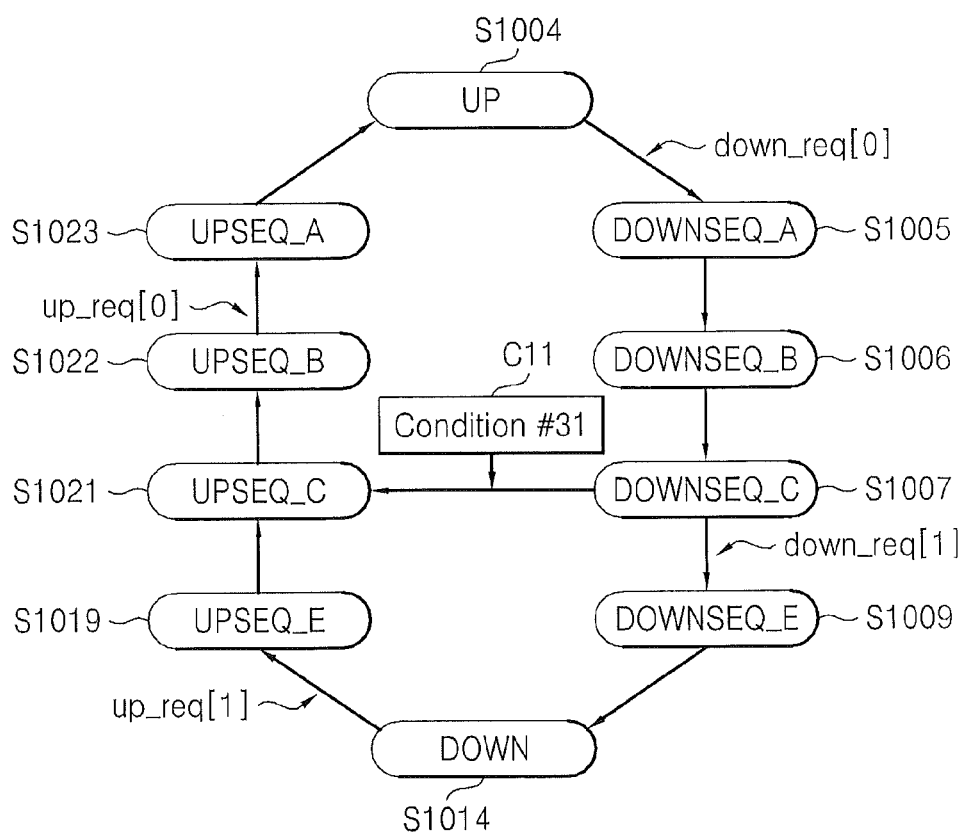
Figure 23:
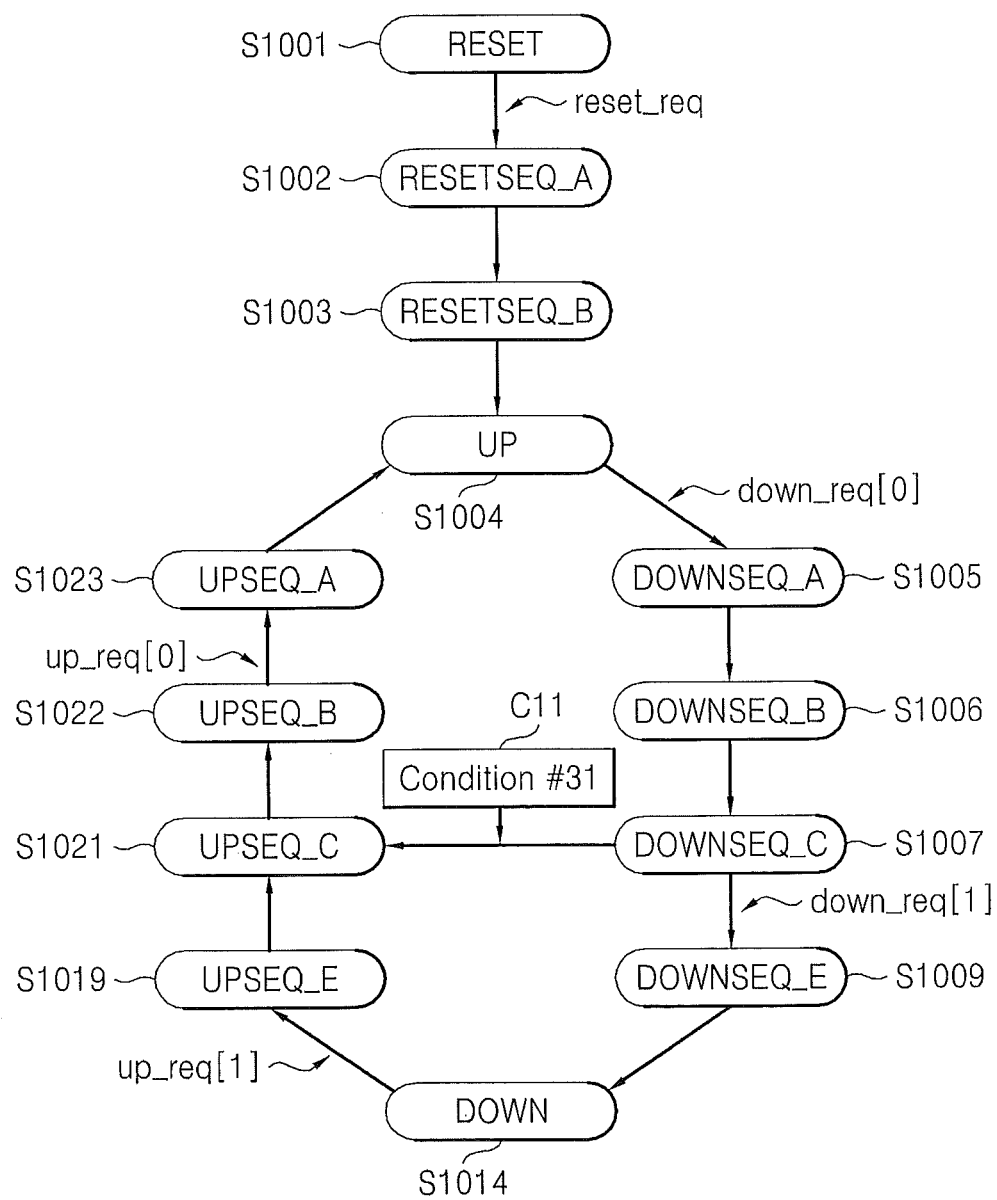
Figure 24:
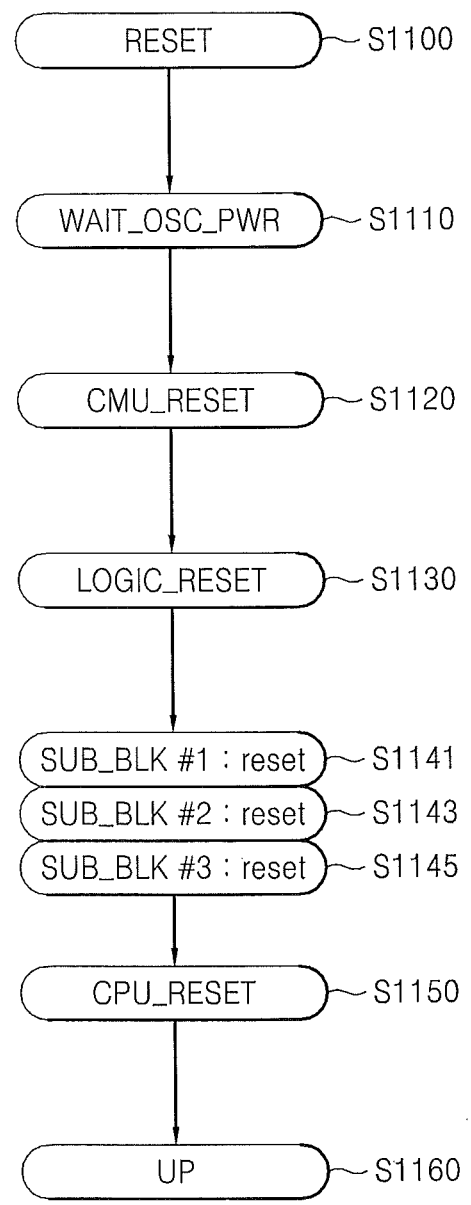
Figure 25:
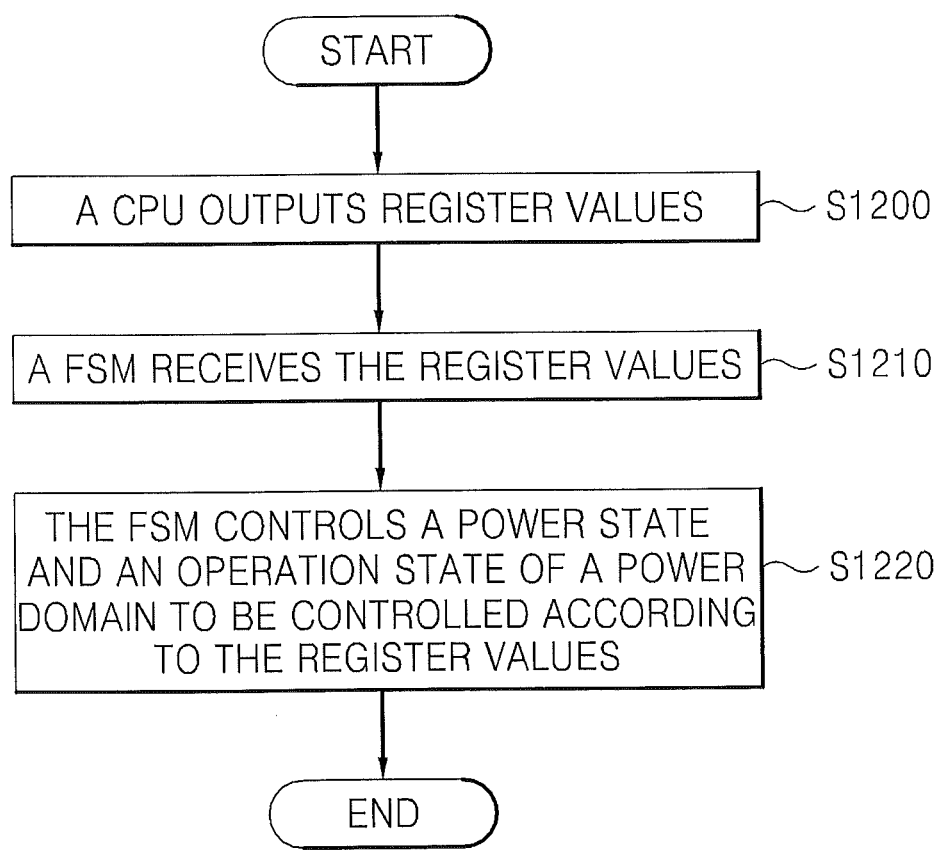
Figure 26:
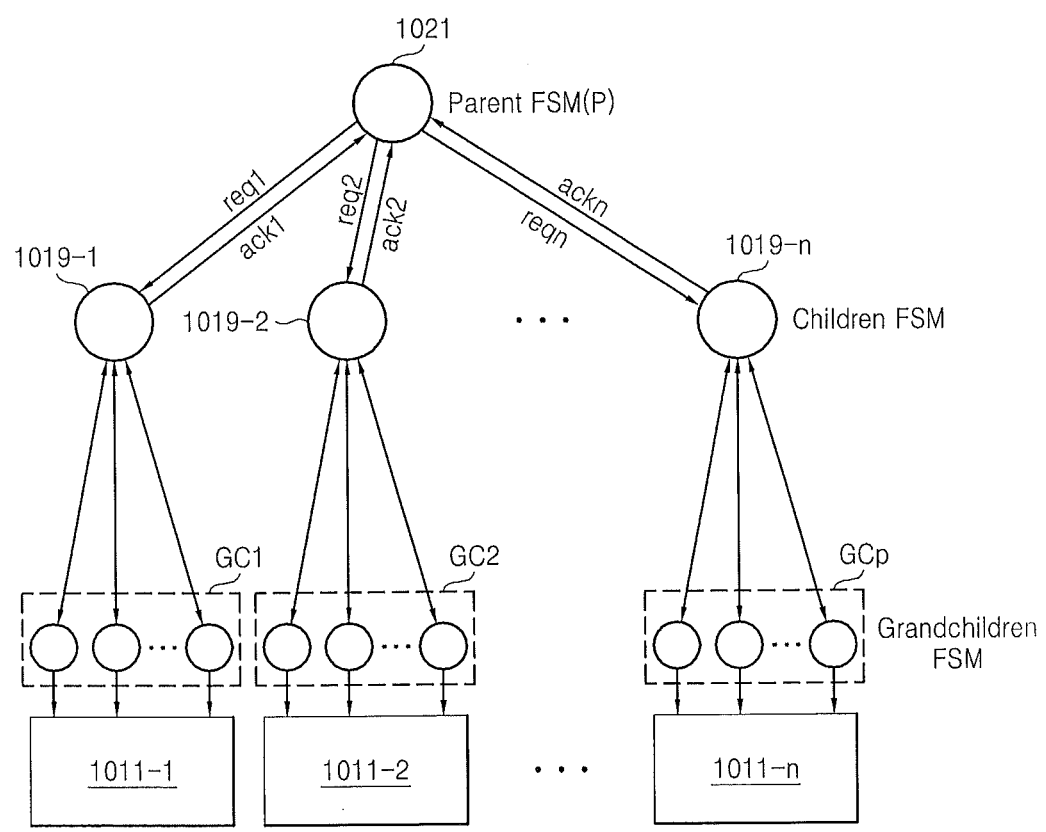
Figure 27:
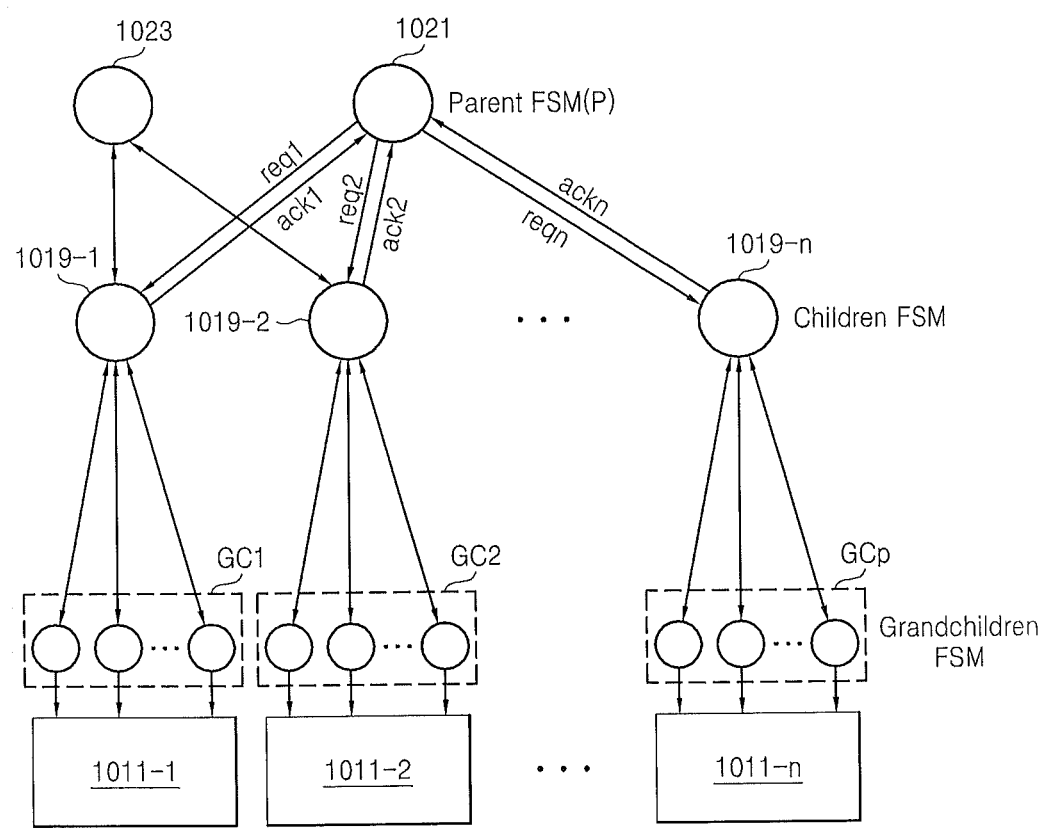
Figure 28:
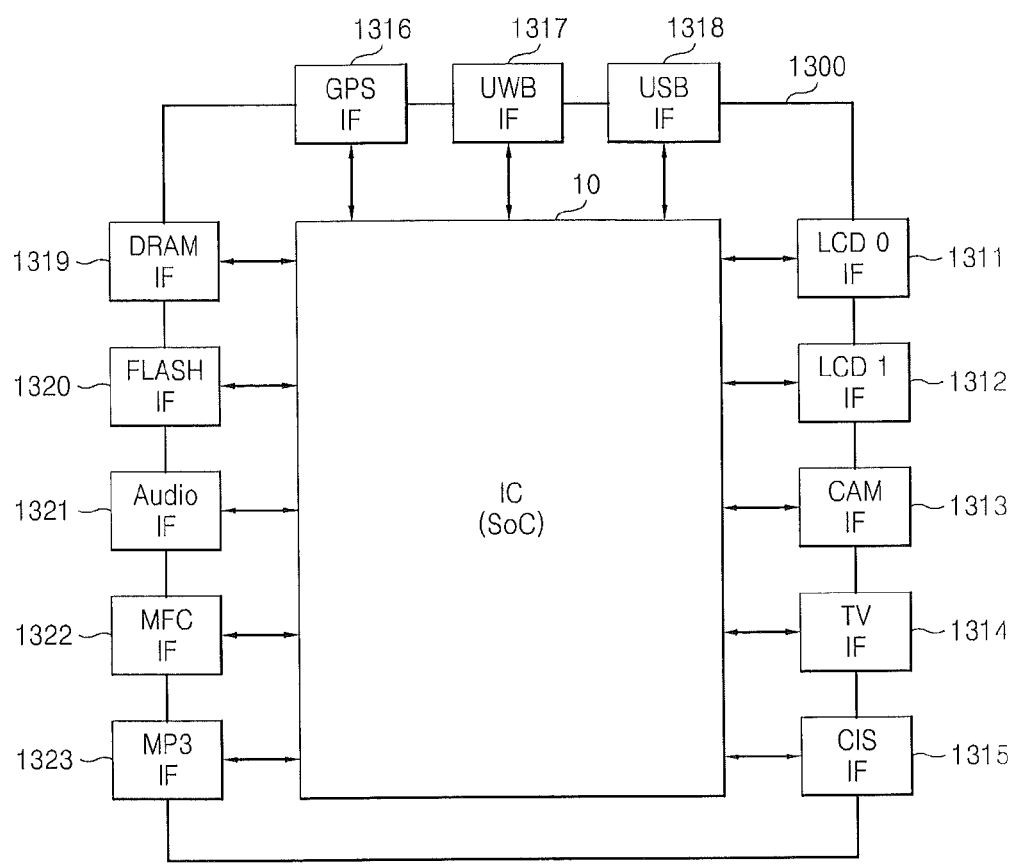

FIG. 12 is a block diagram of a SoC according to an example embodiment of the present inventive concept;

FIG. 13 is a block diagram of a first power domain and a first finite state machine illustrated in FIG. 12;

FIG. 14 is a block diagram of a second power domain illustrated in FIG. 12;

FIG. 15 is a block diagram of a data storage device illustrated in FIG. 14;

FIG. 16 is a block diagram of an isolation circuit illustrated in FIG. 12;

FIG. 17 is a block diagram of a second finite state machine illustrated in FIG. 12;

FIG. 18 is a generic state diagram of a finite state machine according to an example embodiment of the present inventive concept;

FIG. 19 illustrates a sub-set according to an example embodiment of a state diagram illustrated in FIG. 18;

FIG. 20 illustrates a sub-set according to another example embodiment of the state diagram illustrated in FIG. 18;

FIG. 21 illustrates a sub-set according to still another example embodiment of the state diagram illustrated in FIG. 18;

FIG. 22 illustrates a sub-set according to still another example embodiment of the state diagram illustrated in FIG. 18;

FIG. 23 illustrates a sub-set according to still another example embodiment of the state diagram illustrated in FIG. 18;

FIG. 24 is a state diagram of a finite state machine performing a reset operation according to an example embodiment of the present inventive concept;

FIG. 25 is a flowchart for explaining an operation of the SoC illustrated in FIG. 12;

FIG. 26 illustrates conceptually an example embodiment of a plurality of finite state machines which are hierarchically embodied;

FIG. 27 illustrates conceptually another example embodiment of a plurality of finite state machines that are hierarchically embodied; and FIG. 28 is a block diagram of an electronic device including the SoC illustrated in FIG. 12.

DETAILED DESCRIPTION

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout the description.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram showing an integrated circuit device according to an exemplary embodiment of the inventive concept. Referring to FIG. 1, an integrated circuit device 100 includes a system bus 110, a power control circuit 120, first to nth power domain blocks 131 to 13n, and a power control circuit 140.

The system bus 110 provides a channel among elements of the integrated circuit device 100.

The power supply circuit 120 receives external power. The power supply circuit 120 converts the external power into internal power to provide power to elements of the integrated circuit device 100.

The power domain blocks 131 to 13n are connected to the system bus 110. The power domain blocks 131 to 13n are configured to perform given operations, respectively. Each of the power domain blocks 131 to 13n may include at least one of the elements, such as a core, an input/output (I/O) interface, a memory, a clock generator, an internal interface, a timer, a power-on reset circuit, etc.

The power domain blocks 131 to 13n are powered independently. For example, the kth power domain block 13k (k being an integer less than or identical to n) is powered via a power line, which is different from power lines of other power domain blocks. Accordingly, power supplied to the kth power domain block 13k is controlled to be independent from power supplied to other power domain blocks. That is, each of the power domain blocks 131 to 13n may be controlled to enter one of a sleep mode and a normal mode independently.

In an exemplary embodiment, the ith power domain block (i being an integer less than n) of the power domain blocks 131 to 13n may be a power domain block dependent to a jth power domain block (j being an integer being less than n), For example, the ith power domain block is a power domain block dependent to the jth power domain block. When power is supplied to the jth power domain block, power supplied to the ith power domain block is controlled to be independent from other power domain blocks. When power to the jth power domain block is interrupted, supplying of power to the ith power domain block is interrupted at the same time.

In an exemplary embodiment, at least one of the power domain blocks 131 to 13n may be a power domain block the power of which is prevented from being interrupted. At least one of the power domain blocks 131 to 13n may be a power domain block which does not have a sleep mode.

In an exemplary embodiment, it is assumed that the first power domain block 131 is a core. The core 131 is configured to control an overall operation of the integrated circuit device 100. For example, the core 131 may be an ARM processor. For example, at least two of the power domain blocks 131 to 13n may be a core. Below, a reference numeral 131 may be used to cite the first power domain block or a core.

In an exemplary embodiment, it is assumed that the second power domain block 132 is an input/output (I/O) interface. The I/O interface 132 is connected to the system bus 110. The I/O interface 132 may include at least one protocol for communicating with an external source. For example, the I/O interface 132 is configured to interface with an external source according to at least one of the interface protocols, such as Universal Serial Bus (USB) protocol, MultiMedia card (MMC) protocol, Peripheral Component Interconnection (PCI) protocol, PCI-Express (PCI-E) protocol, Advanced Technology Attachment (ATA) protocol, Serial-ATA protocol, Parallel-ATA protocol, Small Computer Small Interface (SCSI) protocol, Enhanced Small Disk Interface (ESDI) protocol, Integrated Drive Electronics (IDE) protocol, Firewire protocol, Ethernet protocol, etc. Below, a reference numeral 132 may be used to cite the second power domain block or an input/output (I/O) interface.

The power control circuit 140 is configured to control power supplied to the integrated circuit device 100. For example, the power control circuit 140 is configured to independently control power supplied to the respective power domain blocks 131 to 13n in response to the control of the core 131. For example, the power control circuit 140 is configured to independently control power supplied to the respective power domain blocks 131 to 13n by controlling a control signal CS.

The power control circuit 140 includes plural power clusters 141 to 14n and a central cluster 150. The power clusters 141 to 14n may correspond to the power domain blocks, respectively. The power clusters 141 to 14n are configured to control power supplied to the respective power domain blocks 131 to 13n independently in response to the control of the core 131 or the central cluster 150. In an exemplary embodiment, the power clusters 141 to 14n are configured to independently control power supplied to the respective power domain blocks 131 to 13n by controlling a control signal CS.

In an exemplary embodiment, when the system bus 110 forms one power domain block, at least one of the power clusters 141 to 14n may correspond to the system bus 110. Likewise, it is possible to provide a power cluster corresponding to the power supply circuit 120 or a clock generating circuit (not shown).

In an exemplary embodiment, the kth power cluster 14k (k being an integer being identical to or less than n) controls power supplied to the kth power domain block 13k independently. The kth power cluster 14k interrupts or resumes supplying of power to the kth power domain block 13k.

The central cluster 150 is configured to control an operating order of the power clusters 141 to 14n in response to the control of the core 131. For example, the central cluster 150 is configured to control the power clusters 141 to 14n sequentially according to a specific order in response to the control of the core 131. For example, the central cluster 150 controls at least two power clusters simultaneously in response to the control of the core 131.

In FIG. 1, there is shown an example that the number of power domain blocks is identical to that of the power clusters. But, the number of power domain blocks can be set to be different from that of power clusters.

FIG. 2 is a flow chart showing an operating method of an integrated circuit device in FIG. 1 according to some embodiments of the inventive concept.

Referring to FIGS. 1 and 2, in block S110, supplying of power to at least one power domain block is controlled by controlling at least one power cluster. For example, under the control of a core 131, at least one power cluster may control power supplied to at least one corresponding power domain block thereto. For example, supplying of power to at least one power domain block is interrupted or resumed under the control of at least one power cluster.

In block S120, supplying of power to power domain blocks is controlled by controlling a central cluster 150. For example, the central cluster 150 may control power clusters 141 to 14n sequentially in response to the control of the core 131. Power supplied to the power domain blocks 131 to 13n may be controlled sequentially by controlling the power clusters 141 to 14n sequentially. For example, supplying of power to the power domain blocks 131 to 13n may be interrupted or resumed.

The operations of block S110 may be performed when an integrated circuit device 100 enters a sleep mode or a normal mode by a power domain block unit. The operations of block S120 may be performed when an integrated circuit device 100 enters a sleep mode or a normal mode by a power domain block unit at a system level.

FIG. 3 is a flow chart showing a process in which power domain blocks enter a sleep mode or a normal mode by a power domain block unit in accordance with some embodiments of the inventive concept.

Referring to FIGS. 1 and 3, in operation S210, a core 131 sends a sleep request to the second power cluster 142. In response to the received sleep request, in operation S215, the second power cluster 142 controls the second power domain block 132 to enter a sleep mode. For example, the second power cluster 142 interrupts a power supplied to the second power domain block 132. Afterwards, in operation S220, the second power cluster 142 sends a sleep response to the core 131.

The operations S210 to S220 may comprise operations for controlling a specific power domain block (for example, the second power domain block 132) of power domain blocks 131 to 13n so as to enter a sleep mode.

In operation S225, the core 131 sends a sleep request to the third power cluster 143. In response to the received sleep request, in operation S230, the third power cluster 143 controls the third power domain block 133 to enter a sleep mode. Afterwards, in operation S235, the third power cluster 143 sends a sleep response to the core 131. The operations S225 to S235 may comprise operations for controlling another power domain block (for example, the third power domain block 132) of the power domain blocks 131 to 13n so as to enter a sleep mode.

Operations S210 to S220 and operations S225 to S235 may be performed independently according to the control of the core 131. For example, whether the operations S210 to S220 were performed, are being performed, or are to be performed, does not affect whether the operations S225 to S235 were performed, are being performed, or are to be performed. Likewise, whether the operations S225 to S350 were performed, are being performed, or are to be performed, does not affect whether the operations S210 to S220 were performed, are being performed, or are to be performed.

In operation S240, the core 131 sends a normal request to the second power cluster 142. In response to the received normal request, in operation S245, the second power cluster 142 controls the second power domain block 132 to enter a normal mode. For example, supplying of power to the second power domain block 132 is resumed under the control of the second power cluster 142. Afterwards, in operation S250, the second power cluster 142 sends a normal response to the core 131.

In operation S255, the core 131 sends a normal request to the third power cluster 143. In response to the received normal request, in operation S260, the third power cluster 143 controls the third power domain block 133 to enter a normal mode. Afterwards, in operation S265, the third power cluster 143 sends a normal response to the core 131.

The operations S225 to S235 may comprise an operation of controlling another power domain block (for example, the third power domain block 132) of the power domain blocks 131 to 13n so as to enter a sleep mode.

The operations S240 to S250 may comprise an operation of controlling a specific power domain block (for example, the second power domain block 132) of the power domain blocks 131 to 13n so as to enter a normal mode. The operations S245 to S265 may comprise an operation of controlling another power domain block (for example, the third power domain block 133) of the power domain blocks 131 to 13n so as to enter a normal mode.

Operations S240 to S250 and the operations S255 to S265 may be made independently. For example, whether the operations S240 to S250 were performed, are being performed, or are to be performed, does not affect whether the operations S255 to S265 were performed, are being performed, or are to be performed. Likewise, whether the operations S255 to S265 were performed, are being performed, or are to be performed, does not affect whether the operations S240 to S250 were performed, are being performed, or are to be performed.

In FIG. 3, an operating method is illustrated in which the second and third power domain blocks 132 and 133 enter a sleep mode and a normal mode according to some embodiments of the inventive concept. Like the second and third power domain blocks 132 and 133, each of the remaining power domain blocks may enter a sleep mode and a normal mode under the control of the core 131 or a corresponding power cluster.

FIG. 4 is a block diagram illustrating one of the first to nth power domain blocks in FIG. 1 according to some embodiments of the inventive concept. Referring to FIG. 4, a power domain block 13k includes plural switches SW1 to SWm, an internal block IB, the first isolation circuit IC1, and the second isolation circuit IC2.

The internal block IB is connected with power lines PL1 to PLm, which are connected to a system bus 110 via corresponding switches SW1 to SWm. The switches SW1 to SWm are controlled in response to a control signal received through the system bus 110. In an exemplary embodiment, the switches SW1 to SWm are controlled in response to a control signal received from the kth power cluster 14k corresponding to the kth power domain block 13k.

The internal block IB is supplied with power via the power lines PL1 to PLm. That is, if the switches SW1 to SWm are controlled under the control of the kth power cluster 14k, power supplied to the kth power domain block 13k may be controlled.

The internal block IB is connected to the system bus 110 via a signal line SL. The internal block IB communicates with the system bus 110 via the signal line SL. In an exemplary embodiment, the signal line SL is able to be replaced with a plurality of signal lines.

The internal block IB communicates with other power domain blocks via the first isolation circuit IC1. In an exemplary embodiment, in FIG. 4, there is shown an example that the internal block IB communicates with the (k−1)th power domain block 13(k−1) via the first isolation circuit IC1.

The first isolation circuit IC1 is connected to the system bus 110 via the first control line CL1. The first isolation circuit IC1 is activated or deactivated in response to a control signal received via the first control line CL1. In an exemplary embodiment, the first isolation circuit IC1 may operate responsive to a control signal received via the first signal line CL1 from the kth power cluster 14k.

The first isolation circuit IC1 being activated isolates the internal block IB from the (k−1)th power domain block 13(k−1) when a power of the kth power domain block 13k is interrupted.

In an exemplary embodiment, when supplying of power to the kth power domain block 13k is interrupted, voltage levels of internal nodes of the kth power domain block 13k may be adjusted to a ground level, respectively. In a case where a node grounded is a node connected with the (k−1)th power domain block 13(k−1), current flows into the kth power domain block 13k from the (k−1)th power domain block 13(k−1). That is, leakage current is generated that flows into the kth power domain block 13k from the (k−1)th power domain block 13(k−1). The first isolation circuit IC1 reduces and/or prevents leakage current by isolating the kth power domain block 13k from the (k−1)th power domain block 13(k−1).

The internal block IB communicates with an external power domain block via the second isolation circuit IC2. In an exemplary embodiment, in FIG. 4, there is shown an example that the internal block IB communicates with the (k+1)th power domain block 13(k+1) via the second isolation circuit IC2. The second isolation circuit IC2 is activated or inactivated in response to a control signal received via the second control line CL2 from the kth power cluster 14k.

Like the first isolation circuit IC1, the second isolation circuit IC2 being activated isolates the kth power domain block 13k from the (k+1)th power domain block 13(k+1).

In FIG. 4, there is shown an example that the kth power domain block 13k includes m switches SW1 to SWm. But, the kth power domain block 13k is able to be configured to receive power via one power line and one switch.

In FIG. 4, the kth power domain block 13k is shown that communicates with two power domain blocks. But, the kth power domain block 13k is able to be configured to communicate with at least one power domain block and not to communicate with other power domain blocks. In an exemplary embodiment, the kth power domain block 13k may include isolation circuits with each corresponding to power domain blocks that communicate with the kth power domain block.

In an exemplary embodiment, the kth power domain block 13k is able to be configured to include one isolation circuit, which is disposed between the internal block IB and signal lines connected with an external source. That is, signal lines that the internal block IB uses to communicate with an external source may be connected in common to one isolation circuit.

FIG. 5 is a state transition diagram showing an operating method of a power cluster controlling a power domain block in FIG. 4 according to some embodiments of the inventive concept. Referring to FIGS. 4 and 5, a power domain block 13k operates at a sleep mode S11 and a normal mode S12 under the control of a power cluster 14k.

When the power domain block 13k is controlled to enter the normal mode S12 from the sleep mode S11, the power cluster 14k turns on switches SW1 to SWm in the power domain block 13k, sequentially. That is, the kth power domain block is powered. Afterwards, the power cluster 14k inactivates the first and second isolation circuits IC1 and IC2. That is, the kth power domain block 13k is controlled to a state where it communicates with an external source. At this time, the kth power domain block 13k enters the normal mode S12.

When the power domain block 13k is controlled to enter the sleep mode S11 from the normal mode S12, the power cluster 14k activates the first and second isolation circuits IC1 and IC2. That is, the kth power domain block 13k is isolated from an external source. Afterwards, the power cluster 14k turns off switches SW1 to SWm in the power domain block 13k, sequentially. That is, supplying of power to the kth power domain block is interrupted. At this time, the kth power domain block 13k enters the sleep mode S11.

An operation of the power cluster 14k may change according to the number of switches SW1 to SWm and the number of isolation circuits IC1 and IC2. For example, if the number of switches SW1 to SWm increases or decreases, there increases or decreases the number of operations necessary for the power cluster 14k to control the switches SW1 to SWm. Likewise, if the number of isolation circuits IC1 and IC2 increases or decreases, there increases or decreases the number of operations necessary for the power cluster 14k to control the isolation circuits IC1 and IC2.

In an exemplary embodiment, the power cluster 14k may be a state machine, which conducts state control operations illustrated in FIG. 5. In an exemplary embodiment, the power cluster 14k may be a processor which conducts state control operations illustrated in FIG. 5.

In FIGS. 4 and 5, there are described the kth power domain block 13k and the k power cluster 14k. The remaining power domain blocks and power clusters may be configured the same as described in FIGS. 4 and 5.

FIG. 6 is a flow chart illustrating another embodiment of a process in which power domain blocks enter a sleep mode or a normal mode by a power domain block unit.

In FIG. 6, there is omitted detailed description for operations that are similar to those described in FIG. 3. Referring to FIGS. 1 and 6, in operation S310, a core 131 sends a sleep request to the second power cluster 142. In operation S315, the core 131 sends a sleep request to the third power cluster 143.

In operation S320, the second power cluster 142 controls the second power domain block 132 to enter a sleep mode. In operation S325, the third power cluster 143 controls the third power domain block 133 to enter a sleep mode. In operation 330, the second power cluster 142 sends a sleep response to the core 131. In operation S335, the third power cluster 143 sends a sleep response to the core 131.

That is, after the core 131 sends a sleep request to a specific power cluster (for example, the second power cluster 142) and before a sleep response is received from the second power cluster 142, the core 131 is able to send a sleep request to another power cluster (for example, the third power cluster 143).

In operation S340, the core 131 sends a normal request to the second power cluster 142. In operation S345, the core 131 sends a normal request to the third power cluster 143.

In operation S350, the second power cluster 142 controls the second power domain block 132 to enter a normal mode. In operation S355, the third power cluster 143 controls the third power domain block 133 to enter a normal mode. In operation 360, the second power cluster 142 sends a normal response to the core 131. In operation S365, the third power cluster 143 sends a normal response to the core 131.

That is, after the core 131 sends a normal request to a specific power cluster (for example, the second power cluster 142) and before a normal response is received from the second power cluster 142, the core 131 is able to send a normal request to another power cluster (for example, the third power cluster 143).

As above described, the core 131 is able to control power clusters 141 to 14n in parallel.

In an exemplary embodiment, the central cluster 150 is configured to control at least two power clusters of a plurality of power clusters at the same time and the remaining power clusters sequentially.

FIG. 7 is a flow chart illustrating a process in which power supply to power domain blocks is controlled by controlling a central cluster in FIG. 2 according to some embodiments of the inventive concept. In FIGS. 1 and 7, in operation S410, a core 131 sends a sleep request to a central cluster 150.

In operation S415, the central cluster 150 sends a sleep request to the first power cluster 141. In operation S420, the first power cluster 141 controls the first power domain block 131 to enter a sleep mode. Afterwards, in operation S425, the first power cluster 141 sends a sleep response to the central cluster 150. The operations S415 to S425 may comprise operations for controlling the first power domain block 131 via the first power cluster 141 to enter a sleep mode.

In operation S430, the central cluster 150 sends a sleep request to the second power cluster 142. In operation S435, the second power cluster 142 controls the second power domain block 132 to enter a sleep mode. Afterwards, in operation S440, the second power cluster 142 sends a sleep response to the central cluster 150.

For ease of description, there is described an example that the central cluster 150 sends a sleep request to the first and second power clusters 141 and 142. But, the central cluster 150 is able to send a sleep request sequentially to the power clusters 141 to 14n in response to a sleep request from the core 131 in accordance with embodiments of the inventive concept.

In an exemplary embodiment, as described with reference to FIG. 6, after the central cluster 150 sends a sleep request to a specific power cluster and before a sleep response is received from the specific power cluster, the central cluster 150 is able to send a sleep request to another power cluster.

In an exemplary embodiment, upon receiving a sleep request from the core 131, the central cluster 150 may operate independently from the core 131. The central cluster 150 and the power clusters 141 to 14n control the power domain block 131 to 13n including the core 131 so as to enter a sleep mode. At this time, the central cluster 150 and the power clusters 141 to 14n maintain a normal mode. The central cluster 150 determines whether a normal event is detected.

In step S445, a normal event is detected. For example, the central cluster 150 may detect the normal event. For example, the normal event may include an access to a pin corresponding to a normal mode among input/output pins (not shown) of the integrated circuit device 100. That is, there is generated an access to a pin corresponding to a normal mode. This case is determined by the central cluster 150 to be a normal event. For example, a control signal can be received from an external source. This case is determined by the central cluster 150 to be a normal event.

For example, the normal event is detected according to an elapsed time after power domain blocks 131 to 13n enter a sleep mode. For example, when the power domain blocks 131 to 13n enter a sleep mode and a time elapses, the central cluster 150 determines that a normal event is detected. For example, the central cluster 150 may include a counter (not shown) for measuring a time.

In operation S450, the central cluster 150 sends a normal request to the first power cluster 141. In operation S455, the first power cluster 141 controls the first power domain block 131 to enter a normal mode. Afterwards, in operation S460, the first power cluster 141 sends a normal response to the central cluster 150.

In operation S465, the central cluster 150 sends a normal request to the second power cluster 142. In operation S470, the second power cluster 142 controls the second power domain block 132 to enter a normal mode. Afterwards, in operation S475, the second power cluster 142 sends a normal response to the central cluster 150.

For ease of description, there is described an example that the central cluster 150 sends a normal request to the first and second power clusters 141 and 142 in response to detection of a normal event. But, the central cluster 150 sends a normal request to the power clusters 141 to 14n in response to detection of a normal event in accordance with embodiments of the inventive concept.

In operation S480, the central cluster 150 sends a normal response to the core 131.

As described above, when the core 131 sends a sleep request to the central cluster 150, the power domain blocks 131 to 13n including the core 131 enter a sleep mode under the control of the central cluster 150, respectively. That is, the integrated circuit device 100 enters a sleep mode under the control of the central cluster 150.

Further, when a normal event is detected by the central cluster 150, the power domain blocks 131 to 13n including the core 131 enter a normal mode under the control of the central cluster 150, respectively. That is, the integrated circuit device 100 enters a normal mode under the control of the central cluster 150.

FIG. 8 is a state transition diagram showing an operating method of a central cluster in FIG. 1 according to some embodiments of the inventive concept.

Referring to FIGS. 1, 7, and 8, a central cluster 150 controls an integrated circuit device 100 to enter a sleep mode S21 and a normal mode S22. As an example, the central cluster 150 controls an integrated circuit device 100 so as to enter a sleep mode S21 and a normal mode S22, in response to a sleep request from a core 131. When a normal event is detected, the central cluster 150 controls an integrated circuit device 100 to enter the normal mode S22.

When the integrated circuit device 100 is controlled to enter a sleep mode S21, the central cluster 150 sequentially controls power clusters 141 to 14n such that power domain blocks 131 to 13n enter a normal mode sequentially.

In an exemplary embodiment, the central cluster 150 sequentially controls the power clusters 141 to 14n according to a specific order. For example, the core 131 is an element that generates an access request to a system bus 110 and other power domain blocks 132 to 13n. When an access request is issued from the core 131, a corresponding element is controlled to a normal mode although it is at a sleep mode. Accordingly, when the device 100 is controlled to a sleep mode, the central cluster 150 controls the first power cluster 141 corresponding to the core 131 prior to controlling other power clusters 142 to 14n.

For example, a bus master, such as an input/output interface 131 or a memory controller (not shown), is an element that generates an access request to the system bus 110. When an access request is issued from the bus master, the system bus 110 is controlled to a normal mode even at a sleep mode. Accordingly, when the device 100 is controlled to a sleep mode, the central cluster 150 controls the second power cluster 142 corresponding to the bus master (for example, the input/output interface 132) following the first power cluster 141 corresponding to the core 131.

For example, the central cluster 150 controls a power domain block, having the higher access priority among power domain blocks prior to other power clusters.

When the device 100 is controlled to a normal mode S22 from a sleep mode S21, the central cluster 150 controls the power clusters 141 to 14n sequentially according to a specific order. In an exemplary embodiment, an operating order of the power clusters 141 to 14n upon entering of the device 100 to the normal mode S22 is reverse to an operating order of the power clusters 141 to 14n upon entering of the device 100 to the sleep mode S21.

As described with reference to FIG. 8, the central cluster 150 and the power clusters 141 to 14n operate even in the case where the core 131 is at an inactive state. Accordingly, the central cluster 150 and the power clusters 141 to 14n are configured by hardware independent from the core 131. For example, the central cluster 150 and the power clusters 141 to 14n may be implemented by a state machine or a processor.

FIG. 9 is a flow chart illustrating another embodiment of a process in which power supplied to power domain blocks is controlled by controlling a central cluster in FIG. 2. Referring to FIGS. 1 and 9, in operation S510, a core 131 sends a maintain request to the second power cluster 142.

In operation S515, the core 131 sends a sleep request to a central cluster 150. In operation S520, the central cluster 150 sends a sleep request to the first power cluster 141. In operation S525, the first power cluster 141 responds to the received sleep request to control the first power domain block 131 so as to enter a sleep mode. In operation S530, the first power cluster 141 sends a sleep response to the central cluster 150. In operations S520 to S530, the first power domain block 131 is controlled to enter a sleep mode through the central cluster 150 and the first power cluster 141.

In operation S535, the central cluster 150 sends a sleep request to the second power cluster 142. The second power cluster 142 operates responsive to the maintain request received from the core 131 in operation S510 and a sleep request received from the central cluster 150. The second power cluster 142 ignores a sleep request received from the central cluster 150 in response to the maintain request received from the core 131. For example, in operation S540, the second power cluster 150 sends a sleep response to the central cluster 150, with the normal mode of the second power domain block 132 being maintained. That is, when the device 100 is controlled to enter a sleep mode, at least one of the power domain blocks 131 to 13n maintains a normal mode in response to the control of the core 131.

In operation S545, the central cluster 150 detects a normal event. In operation S550, the central cluster 150 sends a normal request to the first power cluster 141. In operation S555, the first power cluster 141 controls the first power domain block 141 so as to enter a normal mode in response to a normal request from the central cluster 150. In operation S560, the first power cluster 141 sends a normal response to the central cluster 150. In operations S550 to S560, the first power domain block 131 is controlled to enter a normal mode through the central cluster 150 and the first power cluster 141.

In operation S565, the central cluster 150 sends a normal request to the second power cluster 142. As described with respect to operation S510, the second power domain block 132 continues to maintain a normal mode according to a maintain request. Accordingly, the second power cluster 142 ignores a normal request provided from the central cluster 150. For example, the second power cluster 142 does not perform an operation according to a normal request provided from the central cluster 150 and sends a normal response to the central cluster 150.

As described above, the power domain blocks 131 to 13n are able to be controlled by power clusters 141 to 14n independently. Each power cluster is configured to have a control function of a corresponding power domain block. For this reason, it is possible to reduce the complexity and area of the power control circuit 140.

When the integrated circuit device 100 is controlled to enter a sleep mode or a normal mode, an operating order of the power clusters 141 to 14n is controlled by the central cluster 150. Accordingly, when a power domain block is added to the device 100, it is unnecessary to revise an overall configuration of the power control circuit 140. In this case, if a power cluster corresponding to a power domain block added to the device 100 is added to the power control circuit 140, the added power domain block is controlled to enter a sleep or normal mode.

Further, if the central cluster 150 is updated to include an operating order of the added power cluster, the device 100 including the added power domain block is controlled to enter a sleep mode or a normal mode. That is, it is possible to improve the adaptability of the power control circuit 140 in the integrated circuit device 100 and to reduce the time and cost caused due to redesigning of the power control circuit 140.

FIG. 10 is a block diagram illustrating an integrated circuit device according to another embodiment of the inventive concept.

Referring to FIG. 10, an integrated circuit device 200 includes a system bus 210, a power supply circuit 220, plural power domain blocks 231 to 23n, a power control circuit 240, and a clock generating circuit 270.

The system bus 210, the power supply circuit 220, and the power domain blocks 231 to 23n are configured to be identical to elements 110, 120, and 131 to 13n illustrated in FIG. 1 and description thereof is thus omitted.

The clock generating circuit 270 is configured to generate a clock. A clock generated by the clock generating circuit 270 is transferred to respective elements of the integrated circuit device 200 via the system bus 210. In the event that the clock generating circuit 270 is one power domain block, at least one of the power clusters 241 to 24n may correspond to the clock generating circuit 270.

The power control circuit 240 includes plural power clusters 241 to 24n, plural clock clusters 241 to 24n, and a central cluster 250.

The power clusters 241 to 24n correspond to the power domain blocks 231 to 23n, respectively. As described with reference to FIGS. 1 to 9, the power clusters 241 to 24n are configured to control power supplied to the power domain blocks 231 to 23n.

The clock clusters 261 to 26n correspond to clock domain blocks. In an exemplary embodiment, in the event that power domain blocks correspond to clock domain blocks, respectively, the power domain blocks 231 to 23n may be the clock domain blocks. At this time, the clock clusters 261 to 26p may correspond to the clock domain blocks 231 to 23n, respectively. In an exemplary embodiment, the integrated circuit device 200 is shown under the assumption that power domain blocks correspond to clock domain blocks. Further, it is assumed that a variable p is identical to a variable n.

Each clock cluster is configured to independently control a clock supplied to a corresponding clock domain block. For example, each clock cluster is configured to control supplying of a clock in response to the control of the central cluster 250 or a core 231.

The central cluster 250 is configured to control the operating order of the power cluster 241 to 24n and the clock clusters 261 to 26p. As described with reference to FIGS. 1 to 9, the central cluster 250 is configured to control a specific operating order of the clock clusters 261 to 26n and a specific operating order of the power clusters 241 to 24n.

FIG. 11 is a state transition diagram illustrating an operating method of a power control circuit of FIG. 10 according to some embodiments of the inventive subject matter. Referring to FIGS. 10 and 11, a power control circuit 240 is configured to control an integrated circuit device 200 to enter a normal mode S31, a first sleep mode S32, and a second sleep mode S33.

In an exemplary embodiment, it is assumed that supplying of a power to the kth power domain block 23k is controlled by the kth power cluster 24k and that supplying of a clock to the kth power domain block 26k is controlled by the kth clock cluster 26k. The kth power cluster 24k and the kth clock cluster 26k control the kth power domain block 23k to enter one of the first and second sleep modes S32 and S33.

When the kth power domain block 23k is at a normal mode S31, the kth clock cluster 26k controls the kth power domain block 23k to enter the first sleep mode in response to the control of a core 231. For example, in response to the control of the core 231, the kth clock cluster 26k interrupts a clock supplied to the kth power domain block 23k. Upon clock interruption, the kth power domain block 23k enters the first sleep mode S32. For example, the first sleep mode S32 may be an operation stop mode for stopping an operation according to a clock. That is, at the first sleep mode S32, static power consumption of the kth power domain block 23k is generated, while dynamic power consumption thereof is reduced or prevented.

When the kth power domain block 23k is at the first sleep mode S32, the kth clock cluster 26k or the kth power cluster 24k controls the kth power domain block 23k to enter a normal mode S31 or the second sleep mode S33 in response to the control of the core 231.

For example, under the control of the kth clock cluster 26k, supplying of a clock to the kth power domain block 23k is resumed. This means that the kth power domain block 23k enters the normal mode S31. An operation of supplying and interrupting a clock to the kth power domain block 23k is carried out identically to that described in FIGS. 3 to 6, except that power supplying and interrupting are replaced with clock supplying and interrupting, and description thereof is thus omitted.

Supplying of power to the kth power domain block 23k is interrupted under the control of the kth power cluster 24k. This means that the kth power domain block 23k enters the second sleep mode S33. During the second sleep mode S33, dynamic power consumption and static power consumption of the kth power domain block 23k may be reduced or prevented.

When the kth power domain block 23k is at the second sleep mode S33, the kth clock cluster 26k controls the kth power domain block 23k so as to enter the first sleep mode in response to the control of the core 231. For example, supplying of power to the kth power domain block 23k is resumed under the control of the kth power cluster 24k. This means that the kth power domain block 23k enters the first sleep mode S32.

Power supplying and interrupting on the kth power domain block 23k may be conducted identically to that described in FIGS. 3 to 6, and description thereof is thus omitted.

In an exemplary embodiment, it is assumed that the integrated circuit device 200 is controlled by the central cluster 250. The central cluster 250 controls the integrated circuit device 200 so as to enter one of the normal mode S31, the first sleep mode S32, and the second sleep mode S33.

When the integrated circuit device 200 is at the normal mode S31, the central cluster 250 controls the integrated circuit device 200 so as to enter the first sleep mode S32 in response to the control of the core 231. For example, the central cluster 250 controls clock clusters 261 to 26p according to a specific order. In response to the control of the central cluster 250, the clock clusters 261 to 26p may interrupt clocks supplied to the power domain blocks 231 to 23n according to a specific order.

When the integrated circuit device 200 is at the first sleep mode, the central cluster 250 controls the integrated circuit device 200 so as to enter a normal mode S31 or the second sleep mode S33. For example, when a normal event is detected, the central cluster 250 controls the integrated circuit device 200 so as to enter the normal mode S31. For example, the central cluster 250 controls the clock clusters 261 to 26p according to a specific order. In response to the control of the central cluster 250, the clock clusters 261 to 26p resume clock supplying to the power domain blocks 231 to 23k. An operation of supplying and interrupting a clock to the power domain blocks 231 to 23n is carried out identically to that described in FIGS. 7 to 9, except that power supplying and interrupting are replaced with clock supplying and interrupting, and description thereof is thus omitted.

In an exemplary embodiment, when a sleep event is detected, the central cluster 250 controls the integrated circuit device 200 so as to enter the second sleep mode S33. For example, when the integrated circuit device 200 enters the first sleep mode S32 and a time elapses, the central cluster 250 controls the integrated circuit device 200 so as to enter the second sleep mode S33. For example, in response to an external control signal, the central cluster 250 controls the integrated circuit device 200 so as to enter the second sleep mode S33.

The central cluster 250 controls the power clusters 241 to 24n according to a specific order. The power clusters 241 to 24n interrupt a power supplied to the respective power domain blocks 231 to 23n according to a specific order.

When the integrated circuit device 200 is at the second sleep mode S33, the central cluster 250 controls the integrated circuit device 200 so as to enter the first sleep mode S32. For example, when a control signal is received from an external source or when the integrated circuit device 200 enters the second sleep mode S33 and a time elapses, the central cluster 250 controls the integrated circuit device 200 so as to enter the first sleep mode S32.

For example, the central cluster 250 controls the power clusters 241 to 24n according to a specific order. The power clusters 241 to 24n resume power supplying of the power domain blocks 231 to 23n according to a specific order. An operation of supplying and interrupting a power to the power domain blocks 231 to 23n is carried out identically to that described in FIGS. 7 to 9.

In an exemplary embodiment, when the integrated circuit device 200 is at a normal mode S31, the central cluster 250 controls the integrated circuit device 200 so as to enter the second sleep mode S33 in response to the control of the core 231. For example, when a sleep request is received from the core 231, the central cluster 250 controls the clock clusters 261 to 26n according to a specific order and the power clusters 241 to 24n according to a specific order.

In an exemplary embodiment, when a normal event is detected, the central cluster 250 controls the integrated circuit device 200 so as to enter a normal mode S31 from the second sleep mode S33. For example, the central cluster 250 controls the power clusters 241 to 24n according to a specific order.

Afterwards, the central cluster 250 controls the clock clusters 261 to 26n according to a specific order.

That is, when the integrated circuit device 200 is controlled to enter a sleep mode, the first sleep mode S32 may be skipped. When the integrated circuit device 200 is controlled to enter a normal mode, the first sleep mode S32 may be skipped. Further, when the integrated circuit device 200 is controlled to enter a sleep mode and a normal mode, the first sleep mode S32 may be skipped.

In an exemplary embodiment, the integrated circuit device 200 is described under the assumption that power domain blocks are clock domain blocks. But, it is well understood that power domain blocks may be configured to be separated from clock domain blocks.

FIG. 12 shows a block diagram of a SoC according to an example embodiment of the present inventive concept. Referring to FIG. 12, the System on Chip (SoC) 1010 may be included in an electronic device, portable communication device, and/or an information technology (IT) device. The SoC 1010 includes a plurality of power domains 1011-1 to 1011-n, where n is a natural number, a power supply circuit 1013, and a power management unit PMU 1017.

Each of the power domains 1011-1 to 1011-n, the power supply circuit 1013, and the PMU 1017 may communicate to each other through a bus 1015.

The SoC 1010 may further include a plurality of isolation circuits 1012-1, 1012-2, . . . each connected between the plurality of power domains 1011-1 to 1011-n. According to one embodiment, each of the plurality of isolation circuits 1012-1, 1012-2, . . . may be connected or disconnected according to register values stored in each of a plurality of finite state machines 1019-1 to 1019-n. According to another embodiment, each of the plurality of isolation circuits 1012-1, 1012-2, . . . may be connected or disconnected according to register values stored in one of the plurality of finite state machines 1019-1 to 1019-n.

Each of the plurality of isolation circuits 1012-1, 1012-2, . . . may be embodied inside or outside each of the plurality of power domains 1011-1 to 1011-n. For example, each of the plurality of isolation circuits 1012-1, 1012-2, . . . may intercept or block a leakage current path which may occur among the plurality of power domains 1011-1 to 1011-n.

Each of the plurality of power domains 1011-1 to 1011-n includes a plurality of intellectual properties (IPs). Here, IP means an integrated circuit device 1010, e.g., a circuit, logic or combination of these which may be integrated on the SoC 1010. In addition, a code may be stored in the circuit or the logic.

For example, IP may include, but is not limited to, a central processing unit (CPU), each of a plurality of cores included in the CPU, a multi-format codec (MFC), a video module (e.g., a camera interface, a joint photographic experts group (JPEG) processor, a video processor or a mixer and so on), a 3D graphic core, an audio system, a driver, a display driver, a volatile memory device, a non-volatile memory, a memory controller, and/or a cache memory.

For example, each of the plurality of power domains 1011-1 to 1011-n may be a set of a plurality of applications or a set of a plurality of modules, which may perform a similar function. The application or the module may be embodied as hardware and/or a software.

The power supply circuit 1013 receives external power EXPWR supplied from outside, e.g., a battery, and generates a plurality of power signals PWR1 to PWRn.

According to an example embodiment, each of the plurality of power signals PWR1 to PWRn may be supplied to each of the plurality of power domains 1011-1 to 1011-n. According to another example embodiment, each of the plurality of power signals PWR1 to PWRn may be supplied to each of a plurality of IPs included in each of the plurality of power domains 1011-1 to 1011-n. Accordingly, at least one power signal may be supplied to a power domain.

A PMU 1017 includes a plurality of finite state machines (FSMs) 1019-1 to 1019-n. Each of the plurality of finite state machines 1019-1 to 1019-n may control each of the plurality of power domains 1011-1 to 1011-n independently according to a control of a CPU, e.g., the CPU embodied in a first power domain 1011-1, especially according to configuration register values output from the CPU.

Each of the plurality of finite state machines 1019-1 to 1019-n may control each power state and/or each operation state of the plurality of power domains 1011-1 to 1011-n independently according to configuration register values set in a configuration register included therein. The configuration register is an example of a storage which may store configuration register values including one-bit or more.

For example, the configuration register values include a plurality of bits, and some of the plurality of bits may be used as identification bits for identifying each of the plurality of finite state machines 1019-1 to 1019-n.

Here, a power state means a power-up state (or a power-on state), a power-down state (or a power-off state), a power-up sequence (or a power-on sequence), or a power-down sequence (or power-off sequence).

The power-up state means a state where a power or a voltage of a power domain to be controlled, e.g., a target power domain, is fully powered up. The power-down state means a state where a power of a target power domain is off.

The power-up sequence means that a target power domain transits from the power-down state to the power-up state directly or through at least one state. The power-down sequence means that a target power region transits from the power-up state to the power-down state directly or through at least one state.

For example, when a first power domain 1011-1 is in a power-up state according to a control of a first finite state machine 1019-1, a second power domain 1011-2 may perform a power-down sequence according to a control of a second finite state machine 1019-2 and a third power domain 1011-3 may perform a power-up sequence according to a control of a third finite state machine 1019-3.

The operation state may be determined according to whether to supply a clock signal to each IP, whether to retain data stored in a data storage device embodied in each IP, whether to use a bus of each IP, whether a pad embodied in each IP is isolated (disconnected) or connected, or whether an interface embodied in each IP is activated and on the like.

According to an example embodiment, the power state and the operation state may be controlled by power domain or by IP, however, example embodiments of the present inventive concept are described herein which the power state is controlled by power domain and the operation state is controlled by IP for convenience of explanation.

However, when a CPU included in a power domain includes a plurality of cores, each power state (e.g., whether to supply a power or not) and each operation state (e.g., whether to reset or not) may be controlled independently by core.

For example, a CPU may monitor each operation of a plurality of IPs included in each of the plurality of power domains 1011-1 to 1011-n, e.g., how much power each IP consumes, whether each IP performs a specific operation, or whether each IP is in an idle state, generate configuration register values indicating a power domain to be controlled, e.g., a target power domain, among the plurality of power domains 1011-1 to 1011-n according to a monitoring result, and output generated configuration register values to the PMU 1017 through a bus 1015.

A finite state machine controlling a power state of the target power domain may interpret the configuration register values output from the CPU and control a power state of the target power domain by power domain according to an interpretation result.

In addition, the finite state machine may control each operation state of a plurality of IPs included in the target power domain according to the configuration register values.

According to an example embodiment, the PMU 1017 may further include a central sequencer 1021 determining an activation sequence (or order) of a plurality of finite state machines 19-1 to 19-n or whether to activate the plurality of finite state machines 1019-1 to 1019-n according to at least one central configuration register value set in the central configuration register 2021-1 therein.

For example, according to the at least one central configuration register value, the PMU 1017 may perform a SoC-level power control operation controlling a power state of each power domain 1011-1 to 1011-n in a uniform or a domain-level power control operation controlling a power state of each power domain 1011-1 to 1011-n independently.

When activation is mentioned without a specific example embodiment in the present inventive concept, the activation means a specific object, e.g., a state, or a finite state machine performs a specific action or work for performing a specific operation, e.g., whether to supply a voltage, whether to supply a clock, whether to retain data, whether to isolate or whether to reset.

The central sequencer 1021 may be embodied in a finite state machine including a plurality of states. For example, a state may be embodied in a circuit, logic, code or a combination of these.

An activation sequence or whether to activate each of the plurality of states may be determined according to the at least a central configuration register value, and an activation sequence or whether to activate each of a plurality of finite state machines, e.g., 1019-1 to 1019-n, may be determined according to an activation sequence or whether to activate each of the plurality of states.

The central sequencer 1021 does not determine each operation or an operation result of a plurality of finite state machines 1019-1 to 1019-n, but only determine an activation sequence or whether to activate each of the plurality of finite state machines 1019-1 to 1019-n. Accordingly, an activated finite state machine may not perform any action or work.

The central sequencer 1021 may communicate with each of the plurality of finite state machines 1019-1 to 1019-n through handshaking. The central sequencer 1021 is in charge of a SoC-level power control, so that each final state of the plurality of power domains 1011-1 to 1011-n, which are controlled independently by each of the plurality of finite state machines 1019-1 to 1019-n activated according to central configuration register values stored in the central sequencer 1021, is the same.

When the final state means a final state of a finite state machine, a sub finite state machine corresponding to the final state may or may not perform a specific action or work.

Exemplarily, the final state may be a normal operation state, a sleep state or a deep-stop state. All of the plurality of power domains 1011-1 to 1011-n become in a power-up state in the normal operation state. All of the plurality of power domains 1011-1 to 1011-n except for the PMU 1017 become in a power-down state in the sleep state. In the deep stop state, a supply of a clock signal to each of a plurality of IPs embodied in each of the plurality of power domains 1011-1 to 1011-*n* is intercepted and power supplied to a CPU also becomes in a power-down state.

According to another example embodiment, the PMU 1017 may further include a reset sequencer 1023, which may control each reset operation of a plurality of finite state machines performing a reset function among the plurality of finite state machines 1019-1 to 1019-*n* and 1021 according to a reset event, e.g., a hardware reset, a software reset, a warm reset or a wakeup reset.

A reset sequencer 1023 may be embodied in a finite state machine including a plurality of states. As illustrated in FIG. 12, the reset sequencer 1023 may control a reset operation of each finite state machine 1019-1, 1019-2 and 1021.

As illustrated in FIG. 13, a first finite state machine 1019-1 includes a plurality of sub-finite state machines 1119-1 and 1119-2. As illustrated in FIG. 17, a second finite state machine 1019-2 includes a plurality of sub-finite state machines 1210-1 to 1210-*s* and a main finite state machine 1200 determining an activation sequence or whether to activate each of the plurality of sub-finite state machines 1210-1 to 1210-*s*. Where s is a natural number.

In some embodiments, each finite state machine described in the present specification includes a configuration register for storing configuration register values output from the CPU 1111.

FIG. 13 shows a block diagram of a first power domain and a first finite state machine illustrated in FIG. 12. Referring to FIGS. 12 and 13, a first power domain 1011-1 illustrated exemplarily includes a CPU 1111, a power line 1101 and a plurality of switches 1110-1 and 1110-2.

The CPU 1111 includes a plurality of cores 1111-1 and 1111-2, and a power signal PWR1 supplied to each core 1111-1 and 1111-2 may be controlled independently according to a control of each sub-finite state machine 1119-1 and 1119-2. Additionally, whether to reset each core 1111-1 or 1111-2 may be controlled independently according to a control of each sub-finite state machine 1119-1 or 1119-2.

For example, the first sub-finite state machine 1119-1 may generate a first switching signal SW11 or a first reset signal RST1 according to a configuration register value set in a configuration register 1120-1 included therein. Accordingly, the first switch 1110-1 may supply power PWR1 to the first core 1111-1 or intercept power PWR1 supplied to the first core 1111-1 according to the first switching signal SW11.

The second sub-finite state machine 1119-2 may generate a second switching signal SW12 or a second reset signal RST2 according to a configuration register value set in a configuration register 1120-2 included therein. Accordingly, the second switch 1110-2 may supply power PWR1 to a second core 1111-2 or intercept power PWR1 supplied to the second core 1111-2 according to the second switching signal SW12.

For example, if a configuration register value stored in a configuration register 1120-1 is set to 0x0 by the CPU 1111 when a power state of each IP 1111-1 and 1111-2 is in a power-up state, i.e., a power signal PWR1 is supplied to each of the IPs 1111-1 and 1111-2, the first sub-finite state machine 1119-1 outputs a switch signal SW11 having a high level. Subsequently, a switch 1110-1 embodied in a PMOS transistor gets turned off, so that a power signal PWR1 supplied to a first core 1111-1 is intercepted.

On the contrary, if a configuration register value stored in a configuration register 1120-1 is set to 0x3 by the CPU 1111 when a power state of each IP 1111-1 and 1111-2 is in a power-down state, i.e., a power signal PWR1 is not supplied to each of the IPs 1111-1 and 1111-2, the first sub-finite state machine 1119-1 outputs a switch signal SW11 having a low level. Accordingly, a switch 1110-1 embodied in a PMOS transistor gets turned on, so that a power signal PWR1 is supplied to the first core 1111-1.

According to a configuration register value set in a configuration register 1120-2, a second sub-finite state machine 1119-2 may supply a power signal PWR1 to a second core 1111-2 or intercept the power signal PWR1 supplied to the second core 1111-2.

FIG. 14 shows a block diagram of a second power domain illustrated in FIG. 12, FIG. 15 shows a block diagram of a data storage device illustrated in FIG. 14, FIG. 16 shows a block diagram of an isolation circuit illustrated in FIG. 12, and FIG. 17 shows a block diagram of a second finite state machine illustrated in FIG. 12.

Referring to FIGS. 14 to 17, a second power domain 1011-2 illustrated exemplarily includes a plurality of first switches 1130-1 to 1130-*k*, where k is a natural number, a plurality of IPs 1140-1 to 1140-*m*, where m is a natural number, a plurality of second switches 1149-1 to 1149-*m*, a clock management unit (CMU) 1150, and a phase locked loop (PLL) 1151.

Each of the plurality of first switches 1130-1 to 1130-*k* is connected between a power line 1131-1 and a common power line 1131-2.

For example, when each of the plurality of first switches 1130-1 to 1130-*k* is embodied in a PMOS transistor, each of the plurality of first switches 1130-1 to 1130-*k* may be turned off according to each of a plurality of switching signals SW31 to SW3*k* output from a first sub finite state machine 1210-1 in a power-down sequence.

That is, each level of a plurality of switching signals SW31 to SW3*k* may be determined according to configuration register values set in a configuration register 1211-1 embodied in a first sub-finite state machine 1210-1.

In a power-up sequence, each of the plurality of first switches 1130-1 to 1130-*k* may be turned on according to each of the plurality of switching signals SW31 to SW3*k* output from the first sub-finite state machine 1210-1.

In other words, each level of the plurality of switching signals SW31 to SW3*k* may be determined according to configuration register values set in a configuration register 1211-1 embodied in the first sub-finite state machine 1210-1. The CPU 1111 may set configuration register values to be stored in the configuration register 1211-1.

Each IP 1140-1 to 1140-*m* includes each internal logic circuit 1141-1 to 1141-*m* and each interface 1145-1 to 1145-*m*. Each internal logic circuit 1141-1 to 1141-*m* may include each data storage device 1143-1 to 1143-*m* as a core of each IP 1140-1 to 1140-*m*.

Each structure of data storage devices 1143-1 to 1143-*m* is the same as what is illustrated in FIG. 15. Each structure of the data storage devices 1143-1 to 1143-*m* is substantially the same as each other, so that a data storage device 1143-1 is illustrated for convenience of explanation.

Each of the data storage devices 1143-1 to 1143-*m* is an example of a data storage device performing a function of retaining data in a power-down sequence or a power-down state.

The data storage device 1143-1 includes a first data storage device 1144-1 and a second data storage device 1144-2. The first data storage device 1144-1 transmits data stored therein to the second data storage device 1144-2 according to a retention control signal RC1 output from a third sub-finite state machine 1210-3. Accordingly, the second data storage device 1144-2 may retain data even in a power-down sequence or a power-down state. For example, each data storage device 1144-1 or 1144-2 may be embodied in a latch.

Whether to retain data of each data storage device 1143-1 to 1143-m is determined according to an activation sequence or whether to activate each of a plurality of control signals RC1 to RCm output from the third sub-finite state machine 1210-3. An activation sequence or whether to activate each of the plurality of control signals RC1 to RCm is determined according to each configuration register value stored in a configuration register 1211-3 of the third sub-finite state machine 1210-3. The CPU 1111 may set configuration register values to be stored in a configuration register 1211-3.

An activation sequence or whether to activate each of a plurality of second switches 1149-1 to 1149-m is determined according to an activation sequence or whether to activate each of a plurality of control signals CT1 to CTm output from a CMU 1150. The CMU 1150 determines an activation sequence or whether to activate each of the plurality of control signals CT1 to CTm according to a control signal CMUC output from a second sub-finite state machine 1210-2.

According to an example embodiment, an activation sequence or whether to activate each of the plurality of second switches 1149-1 to 1149-m may be determined directly according to control of the second sub-finite state machines 1210-2.

Each of the plurality of second switches 1149-1 to 1149-m may be embodied in an AND gate. Accordingly, each AND gate 1149-1 to 1149-m may supply or intercept each clock signal CLK1 to CLKm to each IP 1140-1 to 1140-m according to a level of each control signal CT1 to CTm.

The CMU 1150 may generate a plurality of clock signals CLK1 to CLKm according to a clock signal CLK output from a PLL 1151. Each of the plurality of clock signals CLK1 to CLKm may be used as each operation clock signal of the plurality of IPs 1140-1 to 1140-m.

Each interface 1145-1 to 1145-m which may be embodied in a circuit or logic may be enabled or disabled according to each control signal PC1 to PCm output from a sub-finite state machine (not shown) which may be embodied in a PMU 1017 and control an operation of each of the interfaces 1145-1 to 1145-m. An activation sequence or whether to activate each control signal PC1 to PCm is determined according to each configuration register value set in a configuration register embodied in the sub-finite state machine.

Each of the interfaces 1145-1 to 1145-m may be a pad. Each pad may perform isolation, connection or retention according to each of the control signals PC1 to PCm. Moreover, each of the interfaces 1145-1 to 1145-m may be an oscillator pad. Each oscillator pad may become on or off according to each control signal PC1 to PCm.

As illustrated in FIG. 17, the second finite state machine 1019-2 includes a main finite state machine 1200 for determining an activation sequence or whether to activate each of a plurality of sub-finite state machines 1210-1 to 1210-s. The activation sequence or whether to activate each of the plurality of sub-finite state machines 1210-1 to 1210-s is determined according to configuration register values set in a configuration register 1201 of the main finite state machine 1200. The CPU 1111 may set configuration register values to be stored in the configuration register 1201.

As described above, the main finite state machine 1200 and each of the plurality of sub-finite state machines 1210-1 to 1210-s communicate with each other through handshaking.

The CPU 1111 may monitor a state of each IP included in each power domain 1011-1 to 1011-n, and generate configuration register values to be set in each configuration register 1201 and 1211-1 to 1211-s according to a monitoring result.

FIG. 18 shows a generic state diagram of a finite state machine according to an example embodiment of the present inventive concept. Referring to FIG. 18, the generic state diagram includes a plurality of states S1001 to S1023.

In some embodiments, each finite state machine described in the present specification includes at least two states among the plurality of states S1001 to S1023.

Each state S1001 to S1023, which may be embodied in a circuit, logic, code or a combination of these may control an operation of a lower finite state machine corresponding to each state S1001 to S1023. Moreover, each state S1001 to S1023 may transmit or receive a request signal and an acknowledge signal to/from a lower finite state machine corresponding to each state S1001 to S1023 through handshaking.

Each condition, e.g., a request signal C1 to C9, is a signal output from an upper finite state machine, and each condition, e.g., a request signal C11 to C13, is a signal generated inside a finite state machine.

Referring to FIG. 18, each state S1005, S1008, S1011, S1013, S1023, S1020, S1017 or S1015 is performed according to each request signal C1 to C9 output from a corresponding upper finite state machine.

A reset sequence includes a state S1001 to a state S1003.

For example, when a reset event C9 is input in a state S1001, a reset sequencer 1023 performs a state S1002 and a state S1003 successively. Each state S1002 or S1003 communicates with each lower finite state machine through handshaking. Accordingly, a target power domain transits to a power-up state S1004 through the state S1002 and the state S1003.

The power down sequence includes a state S1005 to a state S1013. The activation sequence (or order) or whether to activate each of a plurality of states S1005 to S1013 is determined according to configuration register values output from a CPU.

When a condition C1, e.g., a power-down request signal, is input from an upper finite state machine to a finite state machine having a power-up state S1004, a state S1004 transits to a state S1005. The state S1005 communicates with its lower finite state machine through handshaking, and the state S1005 transits to a state S1006 according to an acknowledge signal output from the lower finite state machine. The state S1006 communicates with its lower finite state machine through handshaking, and the state S1006 transits to a state S1007 according to an acknowledge signal output from the lower finite state machine.

When a condition C11 occurs before a condition C2 is input from an upper finite state machine, the state S1007 does not transit to a state S1008, but transits to a state S1021. However, when a condition C2 is input from an upper finite state machine before the condition C11 occurs, the state S1007 transits to the state S1008. The power-up state S1004 transits a power-down state S1014 through a plurality of states S1005 to S1013.

The power-up sequence includes a state S1015 to a state S1023. An activation sequence or whether to activate each of a plurality of states S1015 to S1023 is determined according to configuration register values output from a CPU.

When a condition C8 is input from an upper finite state machine, a power down state S1014 transits to a state S1015 and the state S1015 communicates with its lower finite state machine through handshaking, and when an acknowledge signal is input from the lower finite state machine, the state S1015 transits to a state S1016. The state S1016 communicates with its lower finite state machine through handshaking. When a condition C7 is input from an upper finite state machine, the state S1016 transits to a state S1017 and the state S1017 communicates with its lower finite state machine through handshaking. The state S1014 transits to a power-up state S104 through a plurality of states S1015 to S1023.

For example, a lower finite state machine corresponding to an activated state may or may not perform an action or work according to a request signal output from the state. For example, although all of states S1005 to S1013 are activated according to configuration register values in a power-down sequence, a lower finite state machine corresponding to a state S1007 may not perform any action or any work. In this case, the state S1007 transits to a state S1008 immediately according to an acknowledge signal output from the lower finite state machine. That is, the state S1007 may be bypassed. A bypassed state or a finite state machine corresponding to the bypassed state may be defined to be deactivated.

For example, a lower finite state machine in a state corresponding to a configuration register value '1' performs a specific action or work and a lower finite state machine in a state corresponding to a configuration register value '0' does not perform any action or work, an activation sequence or whether to activate each of a plurality of states corresponding to each of the configuration register value may be determined.

For example, when configuration register values are set to '111111111' in a power down sequence, a plurality of states S1005 to S1013 are successively activated and accordingly a lower finite state machine corresponding to each of the plurality of states S1005 to S1013 may perform a specific action or fixed work. However, when configuration register values are set to '101010101', each state S1006, S1008, S10010 and S10012 is bypassed. That is, each state S1006, S1008, S10010 and S10012 may be defined to be deactivated.

According to an example embodiment, when configuration register values are set to '101010101' and an action or work corresponding to a state S1005 is finished, the state S1005 transits or jumps to a state S1007, and when an action or work corresponding to the state S1007 is finished, the state S1007 transits to a state S1009. Similarly, the state S1009 transits to a state S1011 and the state S1011 transits to a state S1013. Accordingly, configuration register values may determine an activation sequence or whether to activate each of a plurality of states. According to an activation sequence or whether to activate each of the plurality of states, an activation sequence or whether to activate each of a plurality of finite state machines is determined.

As described above, a state corresponding to a configuration register value '1' or a finite state machine corresponding to the state may be defined to be activated, and a state corresponding to a configuration register value '0' or a finite state machine corresponding to the state may be defined to be deactivated.

FIG. 19 shows a sub-set according to an example embodiment of the state diagram illustrated in FIG. 18. A sub-set illustrated in FIG. 19 is a state diagram of a finite state machine including only two states S1004 and S1014 among a plurality of states S1001 to S1023, which are included in the state diagram of FIG. 18.

Referring to FIGS. 12, 13, 17, 18, and 19, each sub-finite state machine 1119-1 and 1210-1 includes two states S1004 and S1014. A target power domain operates normally in a power up state S1004, and the target power domain in a power down state S1014 is in a power down state. Each state S1004 or S1014 transits according to each request signal down_req and up_req. A source of each request signal down_req and up_req is each configuration register 1120-1 and 1211-1.

The central sequencer 1021 is in charge of SoC-level power control, and each configuration register 1120-1 and 1211-1 is in charge of domain-level power control.

FIG. 20 shows a sub-set according to another example embodiment of the state diagram of FIG. 18. A sub-set illustrated in FIG. 20 is a state diagram of a finite state machine including a plurality of states S1004 to S1007, S1009, S1014, S1019 and S1021 to S1023 among a plurality of states S1001 to S1023 included in the state diagram of FIG. 18.

Referring to FIG. 20, there are a plurality of states S1005, S1006, S1007 and S1009 between a power up state S1004 and a power down state S1014. According to a request signal down_req output from an upper finite state machine, the power up state S1004 may transit to the power down state S10014 through a plurality of states S1005, S1006, S1007 and S1009. That is, a power domain or an IP having a power up state S1004 may transit to the power down state S1014 through a power down sequence including the plurality of states S1005, S1006, S1007 and S1009.

According to a request signal up_req output from an upper finite state machine, the power-down state S1004 may transit to the power-up state S1004 through a plurality of states S1019, S1021, S1022 and S1023. That is, a power domain or an IP having the power down state S1014 may transit to the power-up state S1004 through a power-up sequence including the plurality of states S1019, S1021, S1022 and S1023.

FIG. 21 shows a sub-set according to still another example embodiment of the state diagram of FIG. 18.

Referring to FIG. 21, there are a plurality of states S1005, S1006, S1007 and S1009 between the power up state S1004 and the power down state S1014. According to a plurality of request signals down_req[0] and down_req[1], the power up state S1004 may transit to the power down state S1014 through the plurality of states S1005, S1006, S1007 and S1009. That is, a power domain or an IP having a power up state S1004 may transit to the power down state S1014 through a power down sequence including the plurality of states S1005, S1006, S1007 and S1009. Each of the plurality of request signals down_req[0] and down_req[1] may be output from an identical upper finite state machine or a different upper finite state machine.

For example, all bus masters corresponding to a target power domain may be disabled according to a first request signal down_req[0], and a power supplied to the target power domain may be intercepted according to a second request signal down_req[1].

According to a plurality of request signals up_req[0] and up_req[1], the power off state S1014 may transit to the power up state S1004 through a plurality of states S1019, S1021, S1022 and S1023. That is, a power domain or an IP having the power up state S1004 may transit to the power down state S1014 through a power down sequence including a plurality of states S1005, S1006, S1007 and S1009. Each of the plurality of request signals up_req[0] and up_req[1] may be output from an identical upper finite state machine or a different upper finite state machine.

FIG. 22 shows a sub-set according to still another example embodiment of the state diagram of FIG. 18. Referring to FIGS. 21 and 22, a state S1007 included in a power down sequence may transit to a state S1021 included in a power up sequence according to a condition C11 before reaching a power down state S1014 through a state S1009. In this case, a power domain or an IP having the power up state S1004 may return to the power up state S1004 again through each state S1021, S1022 or S1023 before reaching the power down state S1014.

As illustrated in FIG. 22, data retention in a target power domain, e.g., L2 cache memory of a CPU, is performed according to a first down request signal down_req[0], and a power supplied to the target power domain, e.g., the L2 cache memory, may be intercepted according to a second down request signal down_req[1].

FIG. 23 shows a sub-set according to still another example embodiment of the state diagram of FIG. 18.

Referring to FIGS. 22 and 23, a finite state machine performing a reset function performs a reset sequence including a plurality of states S1002 and S1003 according to a reset request signal reset_req output from an upper finite state machine. Accordingly, a corresponding power domain transits from a state S1001 to the power up state S1004 according to a control of the upper finite state machine.

FIG. 24 shows a state diagram of a finite state machine performing a reset operation according to an example embodiment of the present inventive concept.

Referring to FIGS. 12 and 24, when a reset event occurs (S1100), a reset sequencer 1023 controls each reset operation of a plurality of finite state machines, which may perform a reset function among a plurality of finite state machines 1011-1 to 1011-n, according to the reset event.

For example, the reset sequencer 1023 may be embodied in a finite state machine without branch. As illustrated in FIG. 24, a finite state machine performing a reset operation on a target power domain or a target IP includes a plurality of states S1110 to S1150 according to a control of the reset sequencer 1023.

During a reset operation, the reset sequencer 1023 or a reset sub finite state machine of a finite state machine makes power supplied to an oscillator (not shown) stand by (S1110), a CMU 1150 is reset (S1120), an internal logic circuit (not shown) is reset (S1130), each sub block included in a memory is reset (S1141, S1143 and S1145), and a CPU is reset (S1150). Accordingly, a corresponding power domain or an IP becomes a power-up state (S1160).

FIG. 25 is a flowchart for explaining an operation of SoC illustrated in FIG. 12 according to some embodiments of the inventive concept.

Referring to FIGS. 12 and 25, a CPU monitors each operation of IPs included in each of a plurality of power domains 1011-1 to 1011-n and generates configuration register values according to a monitoring result (S1200).

One of a plurality of finite state machines 1019-1 to 1019-n, which control independently each of the plurality of power domains 1011-1 to 1011-n each including a plurality of IPs, receives the configuration register values output from the CPU (S1210).

The one of the plurality of finite state machines controls a power state and an operation state of one of the plurality of power domains 1011-1 to 1011-n according to the configuration register values (S1220).

FIG. 26 shows conceptually an example embodiment of a plurality of finite state machines, which are hierarchically embodied. Referring to FIGS. 12 and 26, an SoC 1010 includes a plurality of power domains 1011-1 to 1011-n each including a plurality of IPs and a PMU 1017.

The PMU 1017 includes a plurality of finite state machines (FSMs) 1021, 1019-1 to 1019-n, GC1 to GCp, which are embodied hierarchically. FIG. 26 illustrates a plurality of FSMs 1021, 1019-1 to 1019-n, GC1 to GCp embodied in three layers for convenience of explanation, however, it is not restricted thereto.

An activation sequence or whether to activate each of children FSMs 1019-1 to 1019-n among the plurality of FSMs 1021, 1019-1 to 1019-n is determined according to first register values set in a parent FSM 1021 where each of the children FSMs 1019-1 to 1019-n belongs, e.g., a central sequencer.

An activation sequence or whether to activate each of grand-children FSM groups GC1 to GCp, which belong to each of the children FSMs 1019-1 to 1019-n, is determined according to second register values set in each of the children FSMs 1019-1 to 1019-n. Each of the grandchildren FSM groups GC1 to GCp includes a plurality of grandchildren FSMs.

Each of the children FSMs 1019-1 to 1019-n controls each of the plurality of power domains 1011-1 to 1011-n independently, and each of grandchildren FSMs included in each of the grandchildren FSM groups GC1 to GCp controls a power state and an operation state of each of the plurality of IPs included in each of the plurality of power domains 1011-1 to 1011-n.

FIG. 27 shows conceptually another example embodiment of a plurality of finite state machines, which are hierarchically embodied. Referring to FIGS. 12, 26 and 27, the PMU 1017 further includes a reset sequencer 1023 controlling each reset operation of a plurality of finite state machines 1019-1 and 1019-2, which may perform a reset function among a plurality of finite state machines 1019-1 to 1019-n.

According to an example embodiment, the reset sequencer 1023 may control a reset operation of the central sequencer 1021.

FIG. 28 shows a block diagram of an electronic device including the SoC illustrated in FIG. 12.

Referring to FIGS. 12 and 28, an electronic device 1300 may be embodied in a personal computer (PC), a laptop computer, a mobile phone, a smart phone, a tablet PC, a personal digital assistant (PDA), and/or a portable multimedia player (PMP).

The electronic device 1300 includes an SoC 1010 and a plurality of interfaces 1311 to 1323, A CPU of the SoC 1010 controls a general operation of the SoC 1010.

The SoC 1010 may communicate with each of a plurality of peripheral devices through each of a plurality of interfaces 1311 to 1323. For example, each of the plurality of interfaces 1311 to 1323 may transmit at least one control signal, which is output from a corresponding IP among a plurality of IPs embodied in each of the power domains 1011-1 to 1011-n, to each of the plurality of peripheral devices.

For example, the SoC 1010 may control a power state and an operation state of each flat panel display device through each display interface 1311 and 1312. The flat display device includes a liquid crystal device (LCD) display, a light emitting diode (LED) display, an organic light emitting diode (OLED) display or an active matrix organic light-emitting diode (AMOLED) display.

The SoC 1010 may control a power state and an operation state of a camcorder through a camcorder interface 1313, control a power state and an operation state of a TV module through a TV interface 1314, and control a power state and an operation state of a camera module or an image sensor module through an image sensor interface 1315.

The SoC 1010 may control a power state and an operation state of a GPS module through a GPS interface 1316, control a power state and an operation state of an ultra wideband (UWB) module through an UWB interface 1317, and control a power state and an operation state of an USB drive through an USB drive interface 1318.

The SoC 1010 may control a power state and a operation state of dynamic random access memory (DRAM) through a DRAM interface 1319, control a power state and an operation state of a non-volatile memory device, e.g., a flash memory, through a non-volatile memory interface 1320, e.g., a flash memory interface, control a power state and an operation state of an audio module through an audio interface 1321, control a power state of MFC through a MFC interface 1322, and control a power state of a MP3 player through a MP3 player interface 1323. Here, a module or an interface may be embodied in hardware or software.

The SoC including a plurality of power domains according to an example embodiment of the present inventive concept may control a power state and an operation state of each of the plurality of power domains independently according to configuration register values set in each of a plurality of finite state machines. Therefore, the SoC may be embodied in a low complexity design.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. An integrated circuit device, comprising:
a plurality of power domain blocks, comprising a core power domain block; and
a power control circuit that is configured to control power supplied to each of the plurality of power domain blocks independently responsive to control communication from the core power domain block, the power control circuit comprising a plurality of power clusters corresponding to the plurality of power domain blocks, respectively;
wherein the plurality of power clusters control power supplied to the plurality of power domain blocks, respectively, independently responsive to the control communication from the core power domain block; and
wherein at least two of the power clusters control one of power on/off, clock on/off, data retention and isolation of the corresponding power domain block respectively.

2. The integrated circuit device of claim 1, wherein the power control circuit further comprises a central cluster that is configured to control an operating order of the plurality of power clusters responsive to the control communication from the core power domain block.

3. The integrated circuit device of claim 1, wherein the plurality of power clusters are configured to interrupt power supplied to the plurality of power domain blocks and to resume the power supplied to the plurality of power domain blocks, respectively, responsive to the control communication from the core power domain block.

4. The integrated circuit device of claim 1, wherein each of the plurality of power domain blocks comprises an isolation circuit configured to electrically isolate the respective power domain block.

5. The integrated circuit device of claim 2, wherein the central cluster is configured to control at least two of the plurality of power clusters simultaneously and remaining ones of the plurality of power clusters sequentially.

6. The integrated circuit device of claim 2, wherein one of the plurality of power clusters is configured to receive a first control signal from the core power domain block and a second control signal from the central cluster, and is further configured to send a response signal to the central cluster responsive to receiving the second control signal and to otherwise ignore the second control signal.

7. The integrated circuit device of claim 2, wherein the central cluster is configured to send a first control signal to a first one of the plurality of power clusters and a second control signal to a second one of the plurality of power clusters before a response is received from the first one of the plurality of power clusters.

8. The integrated circuit device of claim 1, wherein at least one of the plurality of power domain blocks corresponds to an input/output interface that is configured for external communication.

9. The integrated circuit device of claim 1, further comprising a system bus that is configured to provide a communication channel between the plurality of power domain blocks and the power control circuit;
wherein one of the plurality of power clusters is configured to control power supplied to the system bus.

10. The integrated circuit device of claim 1, wherein the power control circuit comprises a plurality of clock clusters that are configured to independently control a plurality of clock signals supplied to the plurality of power domain blocks, respectively, responsive to the control communication from the core power domain block;
wherein the power control circuit further comprises a central cluster that is configured to control an operating order of the plurality of clock clusters responsive to the control communication from the core power domain block.

11. A System on Chip (SoC) comprising:
a plurality of power domains each including a plurality of intellectual properties (IPs);
a power control unit including a plurality of finite state machines each controlling a power state and an operation state of each of the plurality of power domains independently according to register values set in a register embodied therein; and
a central sequencer determining an activation sequence or whether to activate each of the plurality of finite state machines according to at least one central configuration register value set in a central configuration register included therein;
wherein each of the plurality of finite state machines comprises:
a plurality of sub-finite state machines each controlling the power state and the operation state independently; and
a main state machine determining an activation sequence or whether to activate each of the plurality of sub-finite state machines according to the register values set therein.

12. The System on Chip (SoC) of claim 11, wherein each of the plurality of finite state machines comprises a plurality of states,
wherein an activation sequence or whether to activate each of the plurality of states is determined according to the register values.

13. The System on Chip (SoC) of claim 11, further comprising a central processing unit (CPU) monitoring each operation of the IPs included in each of the plurality of power domains and generating the register values for a power domain to be controlled among the plurality of power domains according to a monitoring result.

14. The System on Chip (SoC) of claim 11, wherein each final state of the plurality of power domains controlled independently by the central sequencer is the same.

15. The System on Chip (SoC) of claim 11, wherein each of the plurality of finite state machines controls the power state defined as a power-up state, a power-down state, a power-up sequence or a power-down sequence by power domain and controls the operation state by IP.

16. The System on Chip (SoC) of claim 1, further comprising a plurality of isolation circuits each connected between the plurality of power domains, wherein each of the plurality of isolation circuits is connected or isolated according to the register values stored in each of the plurality of finite state machines.

17. The System on Chip (SoC) of claim 11, wherein each of the plurality of finite state machines comprises:

a first sub-finite state machine for determining the power state; and a second sub-finite state machine for determining the operation state, wherein each of the plurality of power domains comprises:

a power line supplying a corresponding power signal among a plurality of power signals output from a power supply circuit;

a common power line which a plurality of IPs included therein are connected to;

a plurality of first switches each connected between the power line and the common power line and switched according to a control of the first sub-finite state machine; and a plurality of second switches for supplying each of a plurality of clock signals output from a clock control unit to each of the plurality of IPs included therein, wherein whether each of the plurality of first switches is switched is determined according to first switch register values stored in the first sub-finite state machine, wherein whether each of the plurality of second switches is switched is determined according to second switch register values stored in the second sub-finite state machine.

18. The System on Chip (SoC) of claim 17, wherein each of the plurality of finite state machines further comprises a third sub-finite state machine for determining the operation state, wherein each of the plurality of power domains comprises a first data storage device and a second data storage device embodied in each of the plurality of IPs included therein, wherein data stored in the first data storage device is retained in the second data storage device according to a retention control signal generated by a retention register value included in the third sub-finite state machine.

19. The System on Chip (SoC) of claim 18, wherein each of the plurality of finite state machines further comprises a fourth sub-finite state machine for determining the operation state, wherein each of the plurality of power domains comprises a plurality of interfaces embodied in each of the plurality of IPs included therein, wherein whether each of the plurality of interfaces is activated or not is determined according to control register values stored in the fourth sub-finite state machine.

20. The System on Chip (SoC) of claim 11, wherein one of the plurality of power domains comprises:

a CPU including a first core and a second core, wherein a finite state machine controlling the one of the plurality of power domains among the plurality of finite state machines comprises:

a first sub-finite state machine controlling the power state of the first core and whether to reset the first core; and a second sub-finite state machine controlling the power state of the second core and whether to reset the second core.

21. A System on Chip (SoC) comprising:

a plurality of power domains each including a plurality of intellectual properties (IPs);

a power control unit each including a plurality of finite state machines controlling a power state and an operation state of each of the plurality of power domains independently according to register values set in a register embodied therein;

a central sequencer determining an activation sequence or whether to activate each of the plurality of finite state machines according to at least one central configuration register value set in a central configuration register included therein; and a reset sequencer controlling each reset operation of a plurality of finite state machines performing a reset function among the plurality of finite state machines.

22. A System on Chip (SoC) comprising:

a plurality of power domains each including a plurality of intellectual properties (IPs); and a power control unit including a plurality of finite state machines (FSMs) embodied hierarchically, wherein an activation sequence or whether to activate each of children FSMs among the plurality of FSMs is determined according to first register values set in a parent FSM where each of the children FSMs belongs;

wherein an activation sequence or whether to activate each of grandchildren FSMs belonging to each of the children FSMs is determined according to second register values set in each of the children FSMs, wherein each of the grandchild FSMs controls independently a power state and an operation state of each of the plurality of IPs included in each of the plurality of power domains; and wherein at least two of the finite state machines embodied hierarchically in the power control unit controls one of power on/off, clock on/off, data retention, and isolation of one of the plurality of power domains respectively.

23. The System on Chip (SoC) of claim 22, wherein the grandchildren FSMs comprises:

a first FSM controlling the power state defined as a power-up state, a power-down state, a power-up sequence or a power-down sequence by power domain; and a second FSM controlling the operation state defined according to whether to supply a clock signal by IP.

* * * * *